(12) United States Patent  (10) Patent No.: US 8,803,840 B2
Sakurai et al.  (45) Date of Patent: Aug. 12, 2014

(54) TOUCH PANEL AND COORDINATE DETECTION METHOD IN TOUCH PANEL

(75) Inventors: Satoshi Sakurai, Shinagawa (JP); Kazuyuki Yoshifusa, Shinagawa (JP); Daisuke Ichikawa, Shinagawa (JP); Masanobu Hayama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 139 days.

(21) Appl. No.: 12/926,846

(22) Filed: Dec. 13, 2010

(65) Prior Publication Data

US 2011/0148808 A1  Jun. 23, 2011

(30) Foreign Application Priority Data

Dec. 18, 2009  (JP) ................................. 2009-287101

(51) Int. Cl.
  *G06F 3/045* (2006.01)
(52) U.S. Cl.
  USPC ........................................................ 345/174
(58) Field of Classification Search
  USPC ........................................................ 345/174
  See application file for complete search history.

(56) References Cited

U.S. PATENT DOCUMENTS

| | | | | |
|---|---|---|---|---|
| 4,739,299 | A | * | 4/1988 | Eventoff et al. .................. 341/5 |
| 5,563,381 | A | * | 10/1996 | Crooks et al. ............. 178/18.03 |
| 5,675,130 | A | * | 10/1997 | Sekizawa .................. 178/18.07 |
| 5,815,141 | A | * | 9/1998 | Phares ........................ 345/173 |
| 2009/0153509 | A1 | | 6/2009 | Jiang et al. |

FOREIGN PATENT DOCUMENTS

| | | |
|---|---|---|
| JP | 63-247813 | 10/1988 |
| JP | 5-289805 | 11/1993 |
| JP | 6-59798 | 3/1994 |
| JP | 2005-182737 | 7/2005 |
| JP | 2005-346235 | 12/2005 |
| JP | 2006-39667 | 2/2006 |
| JP | 2008-135291 | 6/2008 |

(Continued)

OTHER PUBLICATIONS

Patent Abstracts of Japan, Publication No. 2005-182737, published Jul. 7, 2005.

(Continued)

*Primary Examiner* — Quan-Zhen Wang
*Assistant Examiner* — Nelson D Runkle, III
(74) *Attorney, Agent, or Firm* — Staas & Halsey LLP

(57) ABSTRACT

A touch panel includes: a first conductive film divided into regions insulated from each other; a second conductive film facing and located away from the first conductive film; a pair of electrodes provided to the second conductive film, the electrodes facing each other; another pair of electrodes provided to the second conductive film, the electrodes facing each other; and a control unit configured to determine whether the first conductive film contacts with the second conductive film in each region, detect one of an X-coordinate and a Y-coordinate of a point where the first conductive film contacts with the second conductive film by applying a voltage to the pair of electrodes in a case where the first conductive film contacts with the second conductive film, discharge the voltage applied to the pair of electrodes after detecting one of the X-coordinate and the Y-coordinate in each region, and detects the other of the X-coordinate and the Y-coordinate in each region by applying a voltage to the another pair of electrodes after discharging the voltage applied to the pair of electrodes.

9 Claims, 29 Drawing Sheets

(56) References Cited

FOREIGN PATENT DOCUMENTS

| JP | 2009-146419 | 7/2009 |
| TW | 200915163 | 4/2009 |
| TW | 200921488 | 5/2009 |
| TW | 200935290 | 8/2009 |

OTHER PUBLICATIONS

Patent Abstracts of Japan, Publication No. 2008-135291, published Jun. 12, 2008.

Office Action issued by the Chinese Patent Office on Jan. 25, 2013 in the corresponding Chinese patent application No. 201010600000.7.

Japanese Office Action issued Jun. 25, 2013 in the corresponding Japanese patent application No. 2009-287101.

Office Action issued by the Japanese Patent Office on Nov. 26, 2013 in the corresponding Japanese patent application No. 2009-287101.

Office Action issued by the Japanese Patent Office on Nov. 26, 2013 in the corresponding Japanese patent application No. 2013-168696.

Office Action issued by the Taiwanese Patent Office on Oct. 23, 2013 in the corresponding Taiwanese patent application No. 099143106.

* cited by examiner

TOUCH PANEL AND COORDINATE DETECTION METHOD IN TOUCH PANEL

CROSS-REFERENCE TO RELATED APPLICATION

This application is based upon and claims the benefit of priority of the prior Japanese Patent Application No. 2009-287101, filed on Dec. 18, 2009, the entire contents of which are incorporated herein by reference.

FIELD

A certain aspect of the embodiments discussed herein is related to a touch panel, and a coordinate detection method in a touch panel.

BACKGROUND

A resistive touch panel is formed by facing an upper layer and a lower layer, each of them including a transparent conductive film. The resistive touch panel detects coordinates of a contact point by a conduction caused by the contact of the conductive film of the upper layer with the conductive film of the lower layer when the touch panel is pushed by a finger, a pen or the like.

Japanese Patent Application Publication No. 2005-182737 (Document 1) discloses a resistive touch panel where a conductive film is formed by transparent conductive polymer. Japanese Patent Application Publication No. 2008-135291 (Document 2) discloses a resistive touch panel where a conductive film is formed by conductive polymer and metal oxide.

In a multi-point input touch panel which divides a conductive film into multiple regions and detects a touch in each region, there has been a case that high-speed detection operation is difficult because a discharge of voltage used for coordinate detection is carried out in each region.

Drawing on the touch panel is performed by sliding a finger or the like which touched the touch panel. In such drawing mode, smooth drawing is prevented when the processing speed of the touch panel is slow.

When there is a region including an extraction wiring in divided regions of a conductive film, there is a case that changes a pull-down resistance value and a shielding frequency of a filter in each region. There is a possibility that the operating speed of the touch panel becomes slow when the number of times of changing the pull-down resistance value and the shielding frequency of the filter becomes large.

When an extraction wiring and a region other than the extraction wiring are touched at the same time, it may be determined that an unintended input is carried out and the incorrect operation of the touch panel may occur.

SUMMARY

According to an aspect of the present invention, there is provided a touch panel including: a first conductive film divided into regions insulated from each other; a second conductive film facing and located away from the first conductive film; a pair of electrodes provided to the second conductive film, the electrodes facing each other; another pair of electrodes provided to the second conductive film, the electrodes facing each other; and a control unit configured to determine whether the first conductive film contacts with the second conductive film in each region, detect one of an X-coordinate and a Y-coordinate of a point where the first conductive film contacts with the second conductive film by applying a voltage to the pair of electrodes in a case where the first conductive film contacts with the second conductive film, discharge the voltage applied to the pair of electrodes after detecting one of the X-coordinate and the Y-coordinate in each region, and detects the other of the X-coordinate and the Y-coordinate in each region by applying a voltage to the another pair of electrodes after discharging the voltage applied to the pair of electrodes.

The object and advantages of the invention will be realized and attained by means of the elements and combinations particularly pointed out in the claims.

It is to be understood that both the foregoing general description and the following detailed description are and explanatory and are not restrictive of the invention, as claimed.

DESCRIPTION OF EMBODIMENTS

A description will now be given of embodiments of the present invention with reference to the accompanying drawings.

First Embodiment

Figure 1A:
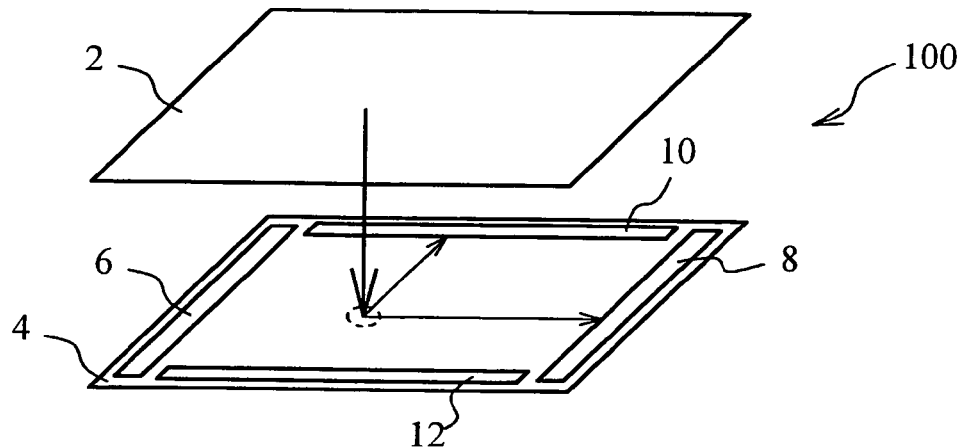
FIG. 1A and FIG. 1B are perspective views illustrating a composition of a touch panel.
Figure 1B:
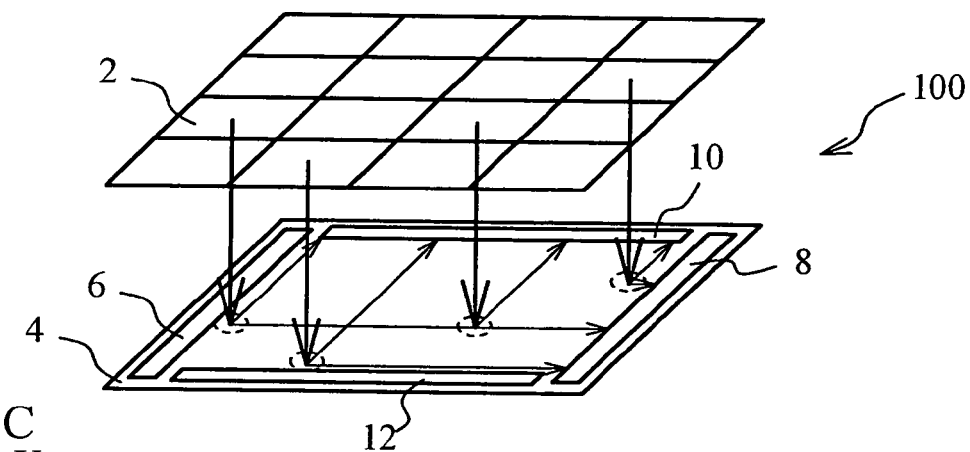

A description will be given of a composition of a touch panel. FIG. 1A and FIG. 1B are perspective views illustrating a composition of a touch panel, and FIG. 1C is a plane view illustrating a composition of the touch panel.

FIG. 1A is a perspective view illustrating a 5-wire resistive touch panel. As illustrated in FIG. 1A, a touch panel 100 is provided with a first conductive film 2, a second conductive film 4, and electrodes 6, 8, 10 and 12. The first conductive film 2 and the second conductive film 4 face each other and are located away from each other. The first conductive film 2 and the second conductive film 4 are composed of conductive material such as ITO (Indium Tin Oxide) and organic conductive polymer. The second conductive film 4 is provided with electrodes 6, 8, 10 and 12 composed of metal such as Ag. Electrodes 6, 8, 10 and 12 are located in the hem of the second conductive film 4 along sides. That is to say that electrodes 6 and 8 form a pair of electrodes facing each other, and electrodes 10 and 12 form another pair of electrodes facing each other. Voltages can be applied to the first conductive film 2, electrodes 6, 8, 10 and 12.

A description will be given of a principle of a 5-wire resistive touch panel. A power-supply voltage Vcc is applied to one of electrodes 6, 8, 10 and 12. Here, a power-supply voltage Vcc is applied to the electrode 6 for example. A pull-down resistor is coupled to the first conductive film 2. When the first conductive film 2 contacts with the second conductive film 4, the electrode 6 to which Vcc is applied contacts with the pull-down resistor, and the potential supplied to the pull-down resistor becomes high. The contact of the first conductive film 2 with the second conductive film 4 is detected by the change to the high potential of the pull-down resistor. Here, if a voltage Vss is applied to the electrode 8 facing the electrode 6, the potential difference is generated between the electrode 6 and the electrode 8. As the resistance of a conductive film changes depending on the distance from the electrode to the point where the first conductive film 2 contacts with the second conductive film 4 (a dotted line region in the drawing), coordinates of the point where the first conductive film 2 contacts with the second conductive film 4 can be detected from the voltage generated between electrodes. In a composition illustrated in FIG. 1A, an X-coordinate is detected by applying a voltage to the electrode 6 and the electrode 8, and a Y-coordinate is detected by applying a voltage to the electrode 10 and the electrode 12.

Figure 1C:
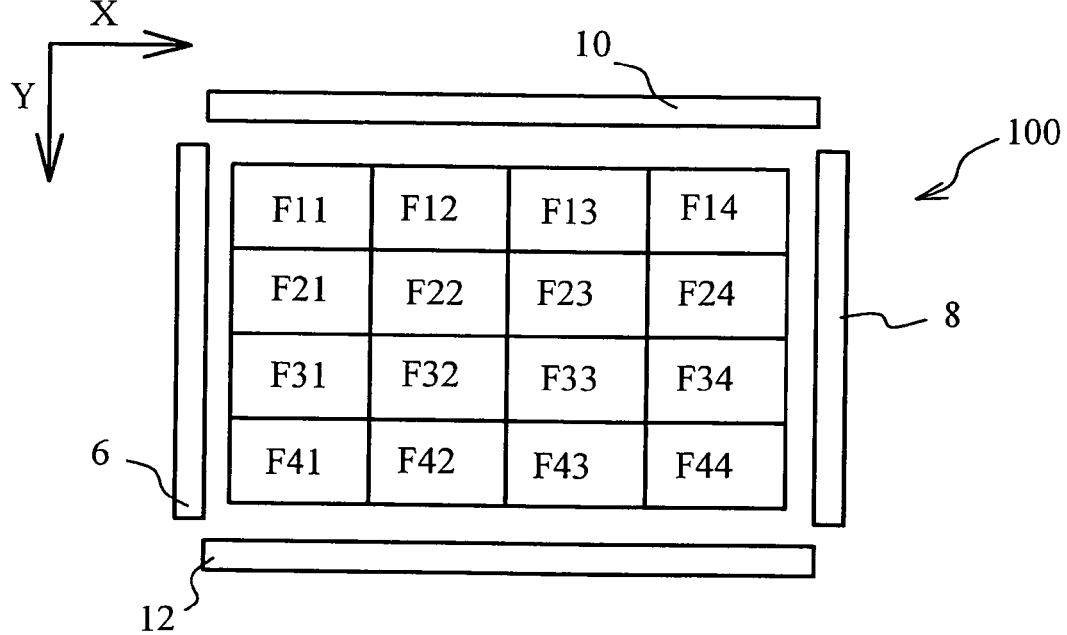
FIG. 1C is a plane view illustrating a composition of the touch panel.

FIG. 1B is a perspective view illustrating the touch panel 100 in accordance with the first embodiment, and FIG. 1C is a plane view of the touch panel 100 from the view above the first conductive film 2. In FIG. 1C, X and Y directions described later are illustrated. As illustrated in FIG. 1B and FIG. 1C, the first conductive film 2 is divided into sixteen regions in a matrix having four rows and four columns. Regions are referred to as F11 through F44. Regions are insulated from each other, and coupled to pull-down resistors. Thus, it is possible to detect a contact of the first conductive film 2 with the second conductive film 4 in each region. That is to say that the touch panel 100 in accordance with the first embodiment is a multi-point input touch panel.

Figure 2:
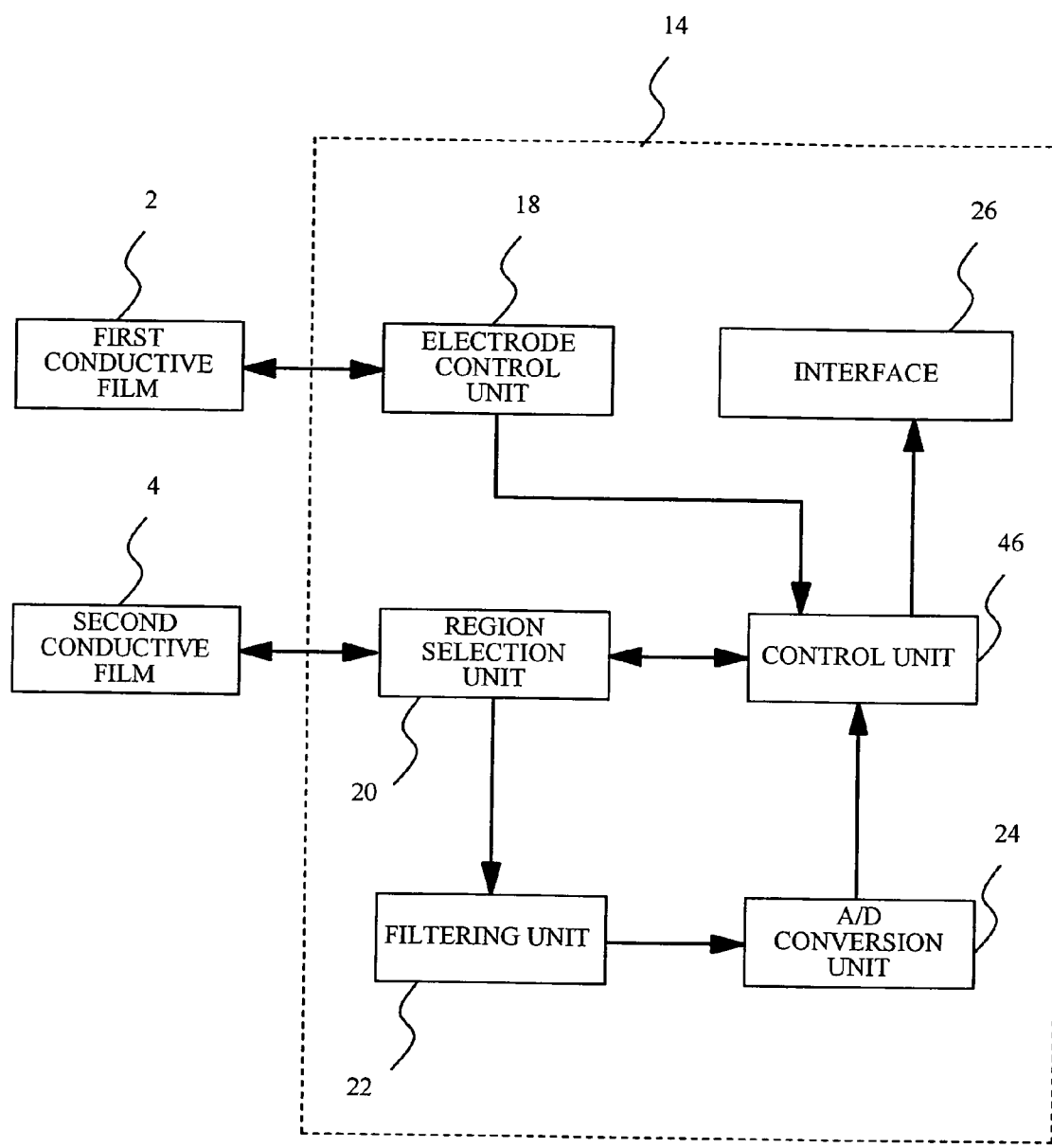
FIG. 2 is a block diagram illustrating a touch panel in accordance with a first embodiment.

A description will now be given of a composition of a control device of the touch panel. FIG. 2 is a block diagram illustrating a composition of a control device of the touch panel.

As illustrated in FIG. 2, a control device 14 is provided with a control unit 16, an electrode control unit 18, a region selection unit 20, a filtering unit 22, an A/D (Analog/Digital) conversion unit 24 and an interface 26.

The electrode control unit 18 is coupled to electrodes 6, 8, 10 and 12 illustrated in FIG. 1A through 1C, applies a voltage to each electrode and discharges the applied voltage. The region selection unit 20 is coupled to the first conductive film 2, and selects a divided region of the first conductive film 2. The region selection unit 20 receives a signal transmitted from a selected region in response to the contact of the first conductive film 2 with the second conductive film 4. The filtering unit 22 includes low-pass filters for example. The filtering unit 22 receives a signal transmitted from the first conductive film 2 via the region selection unit 20, filters out noise, and transmits the signal to the A/D conversion unit 24. The A/D conversion unit 24 converts a signal, which is transmitted from the first conductive film 2 and filtered out, from analog to digital.

The control unit 16 is a microcomputer for example, and controls the electrode control unit 18, the region selection unit 20 and the interface 26. Moreover, the control unit 16 receives signals transmitted from the A/D conversion unit 24, and determines in which of regions F11 through F44 the first conductive film 2 contacts with the second conductive film 4 on the basis of received signals. In addition, the control unit 16 outputs the coordinate of the point where the first conductive film 2 contacts with the second conductive film 4. That is to say that the control unit 16 executes a coordinate conversion based on received signals. The interface 26 outputs coordinate information output from the control unit 16 to an external apparatus such as a computer coupled to the touch panel 100.

Figure 3:
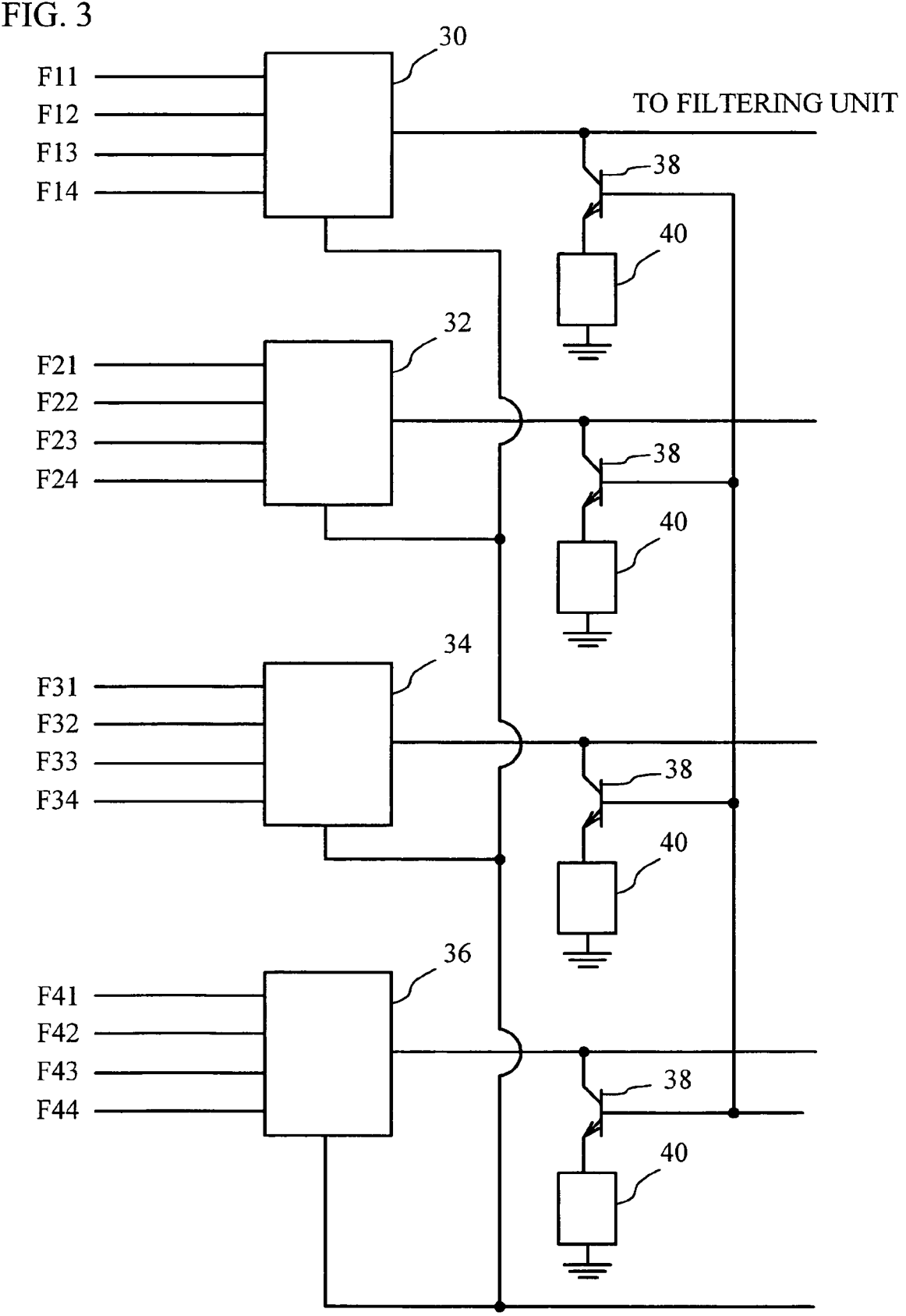
FIG. 3 is a diagram illustrating a composition of a region selection unit 20.

A description will now be given of a composition of the region selection unit 20. FIG. 3 is a diagram illustrating a composition of the region selection unit 20.

As illustrated in FIG. 3, regions F11 through F14 are coupled to a multiplexer 30, regions F21 through F24 are coupled to a multiplexer 32, regions F31 through F34 are coupled to a multiplexer 34, and regions F41 through F44 are coupled to a multiplexer 36. Each of multiplexers 30 through 36 receives signals transmitted from regions coupled to it, and receives a select signal transmitted from the control unit 16. An output side of each of multiplexers 30 through 36 is coupled to the filtering unit 22, and coupled to ground via a transistor 38 and a pull-down resistor 40. That is to say that the output side is coupled to a collector of the transistor 38. An emitter of the transistor 38 is coupled to ground via the pull-down resistor 40, and a signal from the control unit 16 is input to a base of the transistor 38. A signal, which is selected by a select signal, of signals received by multiplexers 30 through 36 from regions is transmitted to the filtering unit 22, and input to the pull-down resistor 40 via the transistor 38. According to this, a high potential is supplied to the pull-down resistor 40, and the contact of the first conductive film 2 with the second conductive film 4 is detected.

Figure 4:
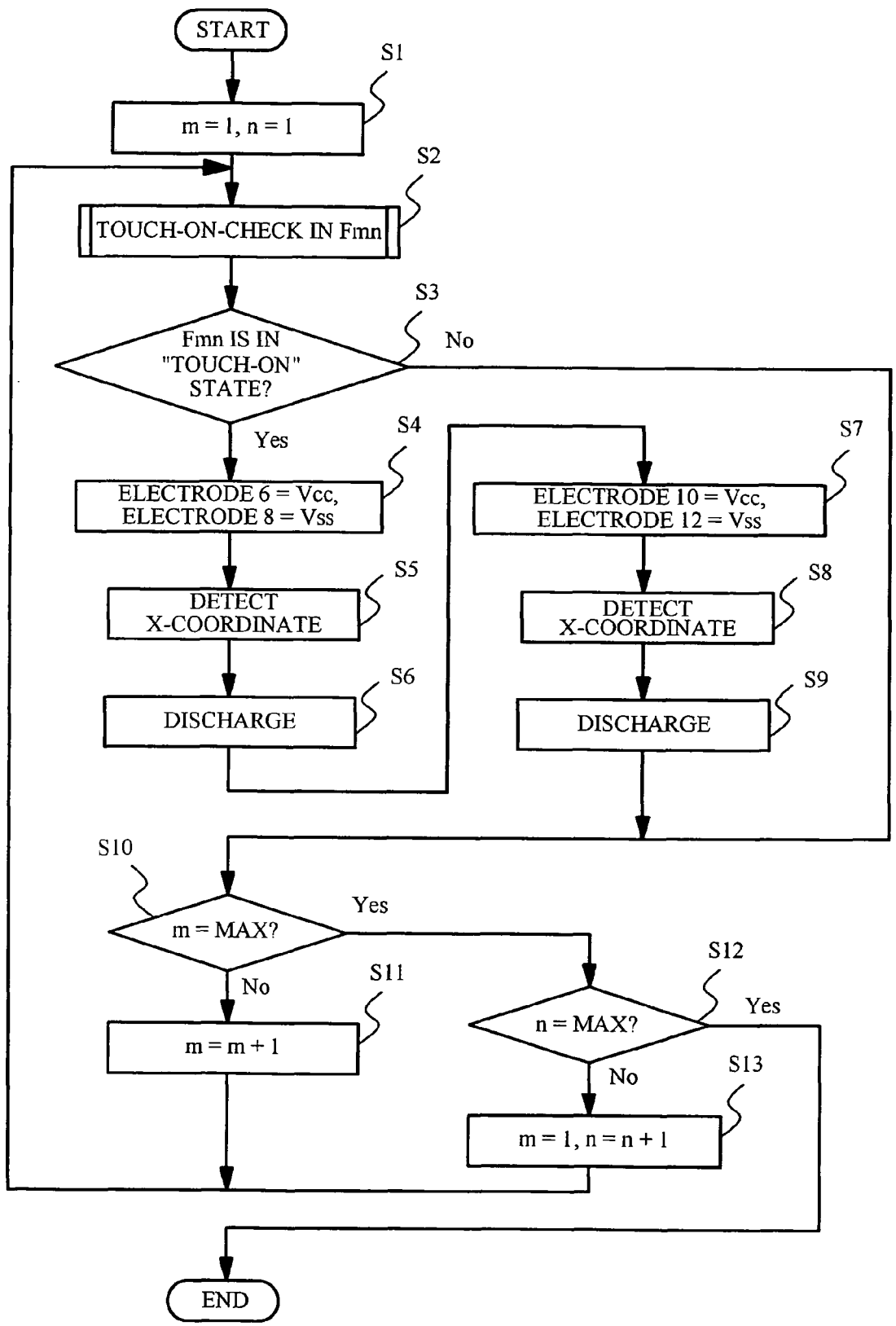
FIG. 4 is a flowchart illustrating a control of a touch panel in accordance with a comparative example.

A description will now be given of a control of the touch panel in accordance with the first embodiment. A description of an comparative example is given before the description of the first embodiment. FIG. 4 is a flowchart illustrating a control of the touch panel in accordance with a comparative example. A region located in mth row of nth column of divided regions of the first conductive film 2 illustrated in FIG. 1B and FIG. 1C is referred to as Fmn.

As illustrated in FIG. 4, the control unit 16 controls the region selection unit 20 to select the region F11 for the object of the process by setting the row number m to 1, and the column number n to 1 (step S1). After the step S1, the control unit 16 checks whether the first conductive film 2 contacts with the second conductive film 4 in the region Fmn (step S2). This means that a check is carried out in each region Fmn starting from the region F11. Hereinafter, in flowcharts, checking whether the first conductive film 2 contacts with the second conductive film 4 is referred to as "touch-ON-check".

Figure 5:
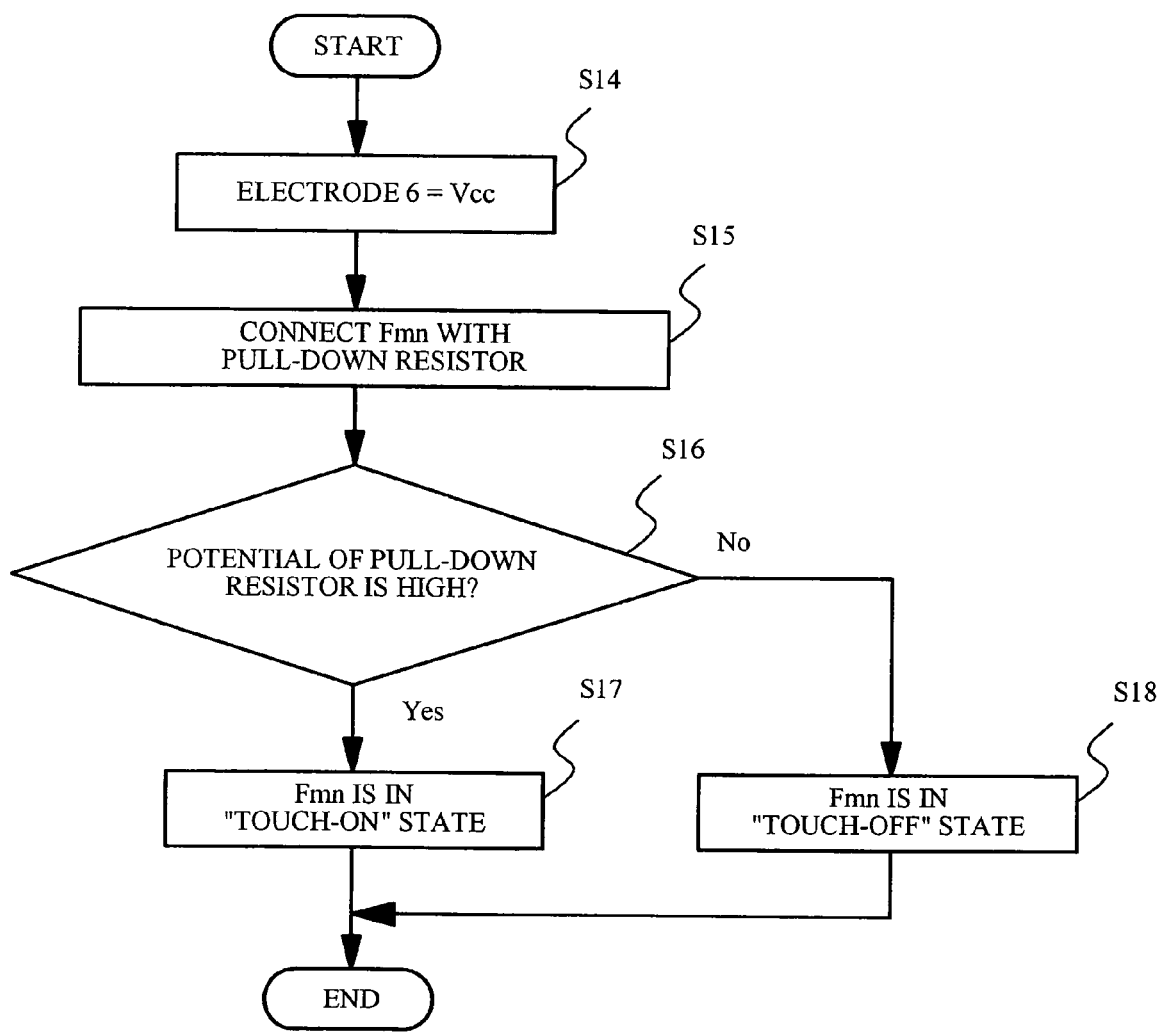
FIG. 5 is a flowchart illustrating a touch-ON-check.

Here, a description will be given of a touch-ON-check with reference to a flowchart. FIG. 5 is a flowchart illustrating a touch-ON-check.

As illustrated in FIG. 5, the electrode control unit 18 applies a voltage Vcc to the electrode 6 (step S14). After the step S14, the region selection unit 20 connects the region Fmn with the pull-down resistor R (step S15). After the step S15, the control unit 16 determines whether the potential of the pull-down resistor R is high (step S16). When the determination is Yes in the step S16, the control unit 16 determines that the first conductive film 2 contacts with the second conductive film 4 in the region Fmn (step S17). When the determination is No in the step S16, the control unit 16 determines that the first conductive film 2 does not contact with the second conductive film 4 in the region Fmn (step S18). Hereinafter, the contact of the first conductive film 2 with the second conductive film 4 is referred to as "touch-ON". After the steps S17 and S18, the process is ended.

Back to FIG. 4, a description will be given of the process after the step S2. After the step S2, the control unit 16 determines whether the first conductive film 2 contacts with the second conductive film 4 in the region Fmn (step S3). When the determination is No, the process moves to a step S10 described later.

When the determination is Yes, the electrode control unit 18 applies Vcc to the electrode 6, and Vss to the electrode 8 (step S4). This is described as "the electrode 6=Vcc, the electrode 8=Vss". This description rule is applied to the electrode 10 and the electrode 12. After the step S4, the control unit 16 detects an X-coordinate of the point where the first conductive film 2 contacts with the second conductive film 4 (step S5). After the step S5, the control unit 16 discharges voltages applied to the electrode 6 and the electrode 8 (step S6). After the step S6, the electrode control unit 18 applies Vcc to the electrode 10, and Vss to the electrode 12 (step S7). After the step S7, the control unit 16 detects a Y-coordinate of the region F11 (step S8). After the step S8, the control unit 16 discharges voltages applied to the electrode 10 and the electrode 12 (step S9).

After the step S9, or when the determination is No in the step S3, the control unit 16 determines whether m is MAX (step S10). Here, "MAX" means a maximum number of the row number m assigned to divided regions. In the example of FIG. 1C, when m is MAX, m is 4 (m=4). When the determination is No, the control unit 16 controls the region selection unit 20 to increment the row number m by one (step S11). After the step S11, the process goes back to the step S2, and the control unit 16 performs the process after the step S2 in the region F21.

When the determination is Yes in the step S10, which means m is 4, the control unit 16 determines whether n is MAX (step S12). Here, "MAX" means a maximum number of the column number n assigned to divided regions. That is to say that 4 is MAX for n. When the determination is No, the control unit 16 controls the region selection unit 20 to set the row number m to one, and increment the column number n by 1 (step S13). After the step S13, the process goes back to the step S2, and the control unit 16 executes the process after the step S2 in the region F12. When the determination is Yes in the step S13, the process is ended.

In the comparative example illustrated in FIG. 4, a touch-ON-check (step S2), a detection of the X-coordinate (step S5), and a detection of the Y-coordinate (step S8) are executed in each region. As illustrated in steps S6 and S9 in FIG. 4, voltages are discharged between the detection of the X-coordinate and the detection of the Y-coordinate. It takes a certain amount of time to discharge voltages. In addition, the number of times of repeating the process from the step S2 increases in proportion to the number of regions. As a result, the operating speed of the touch panel may become slow. As described above, there is a problem in speeding up the operating speed of the touch panel in a multi-point input touch panel.

Figure 6:
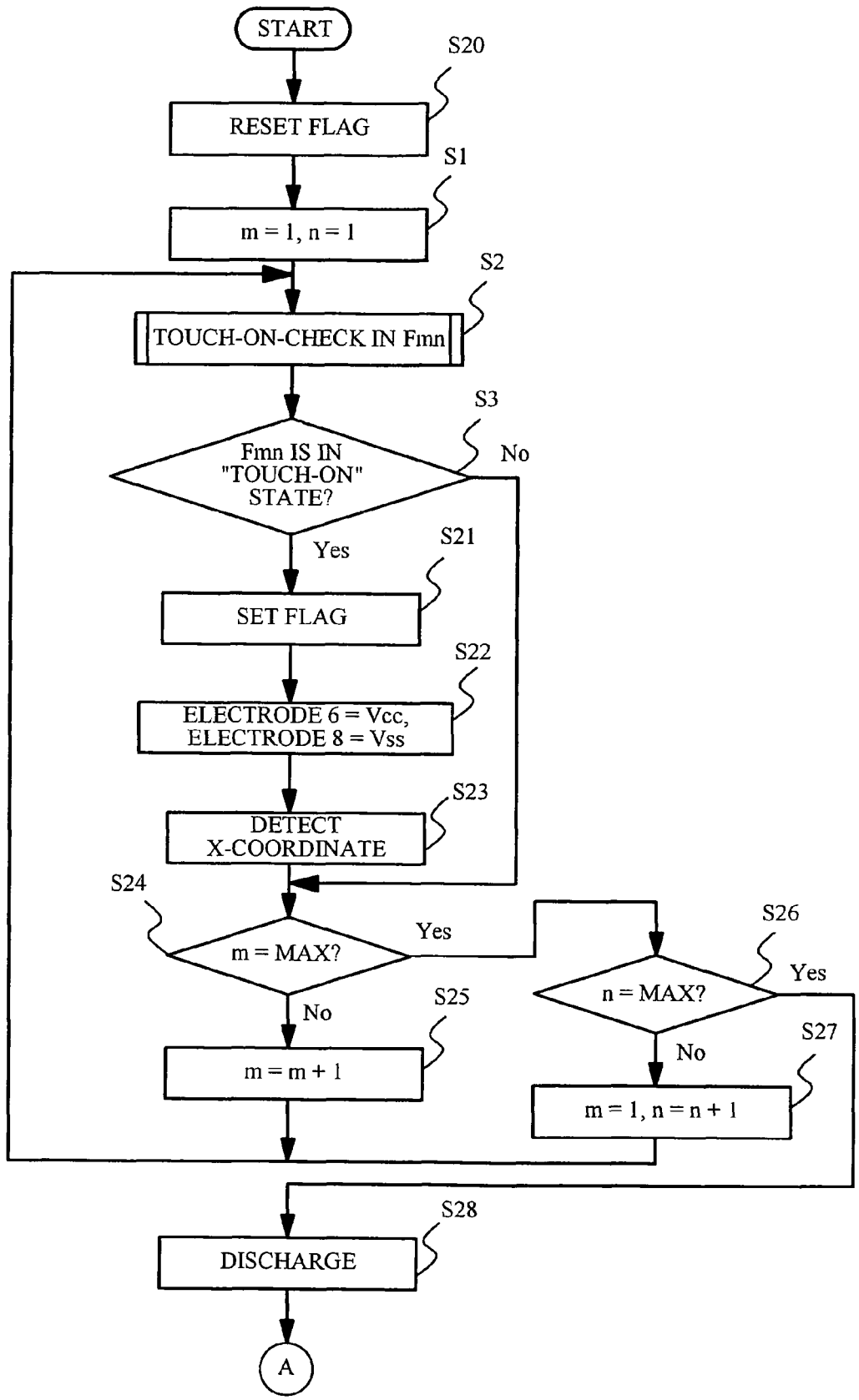
FIG. 6 is a flowchart illustrating a control of the touch panel in accordance with the first embodiment.
Figure 7:
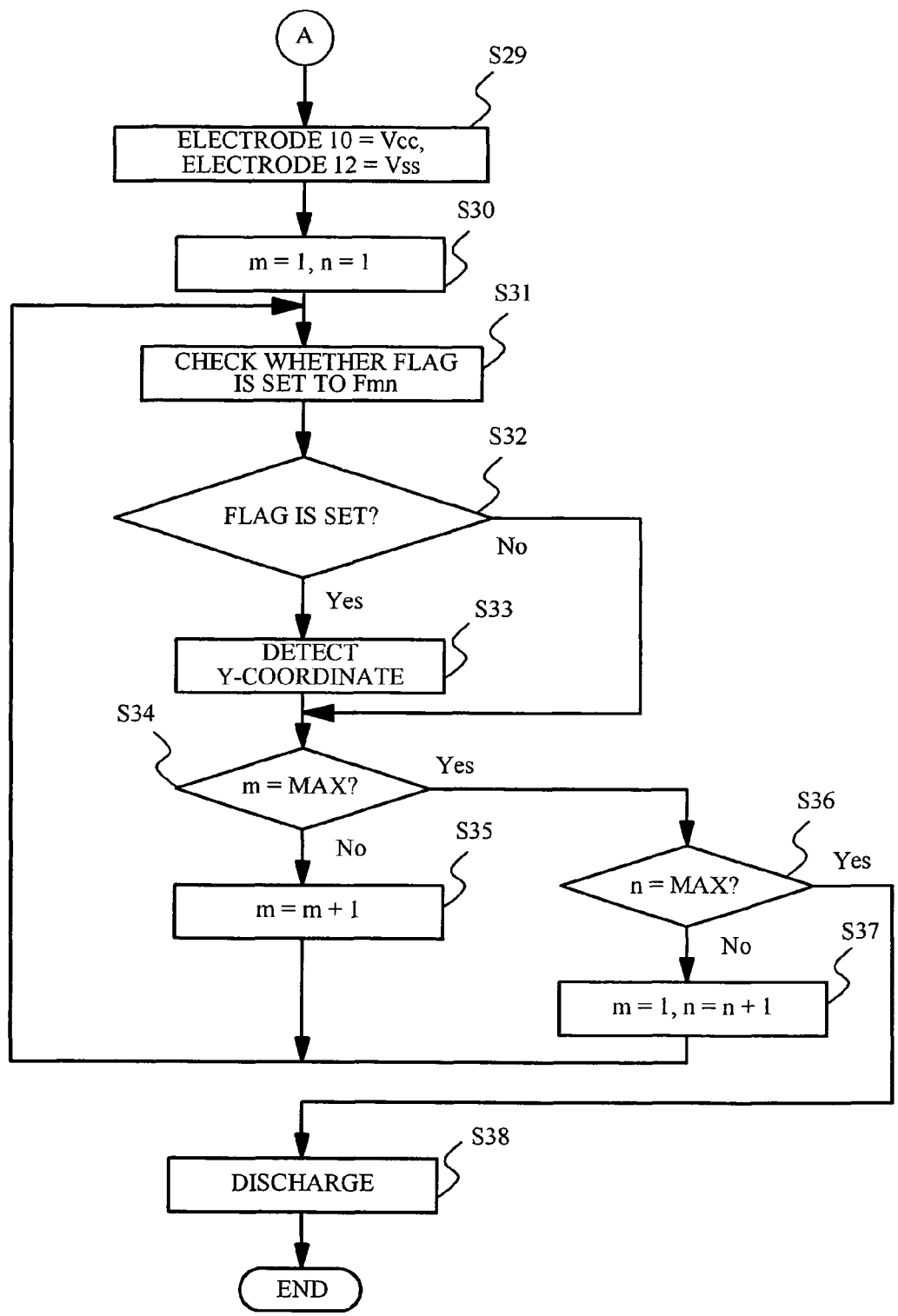
FIG. 7 is a flowchart illustrating the control of the touch panel in accordance with the first embodiment.

A description will now be given of a control of the touch panel in accordance with the first embodiment. FIG. 6 and FIG. 7 are flowcharts illustrating a control of the touch panel in accordance with the first embodiment.

As illustrated in FIG. 6, the control unit 16 resets a flag of each region (step S20). After the step S20, the control unit 16 performs the process from the step S1 to the step S3. That is to say that the control unit 16 determines whether the first conductive film 2 contacts with the second conductive film 4 with respect to each region Fmn starting from the region F11. When the determination is No in the step S3, the process goes to the step S24 described later. When the determination is Yes, the control unit 16 sets a flag to the region Fmn determined to be in a "touch-ON" state (step S21).

After the step S21, the control unit 16 controls the electrode control unit 18 to apply Vcc to the electrode 6 and Vss to the electrode 8 (step S22). After the step S22, the control unit 16 detects an X-coordinate of the point where the first conductive film 2 contacts with the second conductive film 4 in the region Fmn (step S23). After the step S23, the process goes to the step S24. Steps S24 through S27 are same as steps S10 through S13 in FIG. 4. That is to say that after detecting the X-coordinate, the control unit 16 determines whether the first conductive film 2 contacts with the second conductive film 4 in the region different from the region determined to be in a "touch-ON" state in the step S3.

When the determination is Yes in the step S26, the control unit 16 controls the electrode control unit 18 to discharge voltages applied to the electrode 6 and the electrode 8 (step S28). That is to say that the control unit 16 discharges voltages applied to the electrode 6 and the electrode 8 after detecting the X-coordinate in each region Fmn. After the step 28, the process goes to the step S29 in FIG. 7 (see "A" in the drawings).

As illustrated in FIG. 7, after the step S28, the control unit 16 controls the electrode control unit 18 to apply Vcc to the electrode 10, and Vss to the electrode 12 (step S29). After the step S29, the control unit 16 sets the row number m to 1, and the column number n to 1 (step S30). After the step S30, the control unit 16 checks whether a flag is set to one of regions Fmn (step S31). After the step S31, the control unit 16 determines whether a flag is set (step S32).

When the determination is Yes, the control unit 16 detects the Y-coordinate of the point where the first conductive film 2 contacts with the second conductive film 4 in a region to which a flag is set (step S33). That is to say that the control unit 16 memorizes a region where the first conductive film 2 contacts with the second conductive film 4, and detects the Y-coordinate in the memorized region. After the step S33, or when the determination is No in the step S32, the process goes to the step S34. Steps S34 through S37 are same as steps S10 through S13. When the determination is Yes in the step S36, the control unit 16 controls the electrode control unit 18 to discharge voltages applied to the electrode 10 and the electrode 12 (step S38). After the step S38, the process is ended.

According to the first embodiment, as voltages are discharged after detecting the X-coordinate in each region Fmn, and then voltages are discharged after detecting the Y-coordinate in each region Fmn, the number of discharges is two regardless of the number of regions (the step S28 in FIG. 6 and the step S38 in FIG. 7). That is to say that it becomes possible to speed up the operating speed of the touch panel by reducing the number of discharges. Moreover, the region where the first conductive film 2 contacts with the second conductive film 4 is memorized, and the Y-coordinate is detected in the memorized region (the step S21 in FIG. 6 and the step S33 in FIG. 7). It becomes possible to further speed up the operating speed of the touch panel because it is not necessary to determine whether the first conductive film 2 contacts with the second conductive film 4 again.

Figure 8:
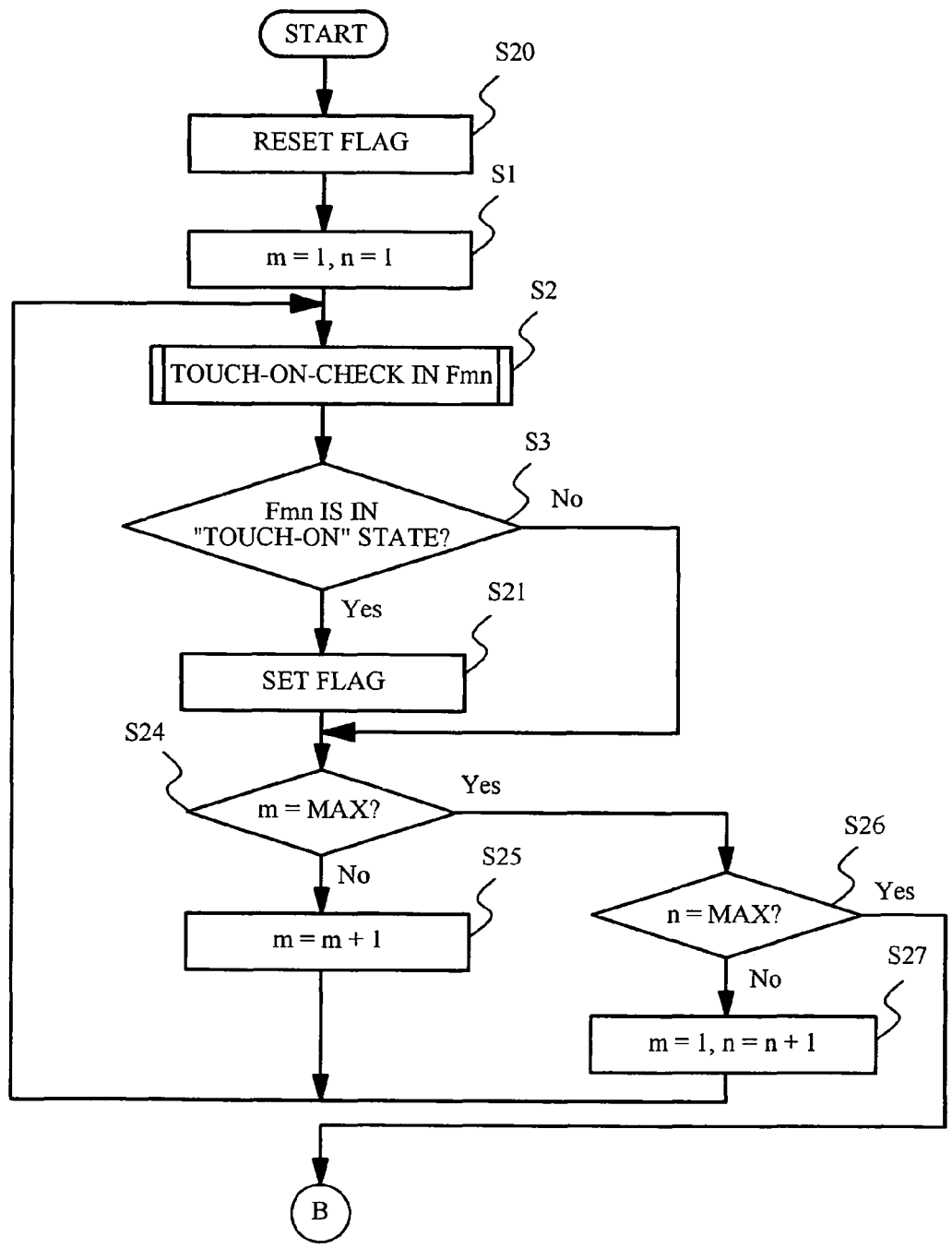
FIG. 8 is a flowchart illustrating the control of the touch panel in accordance with the first embodiment.
Figure 9:
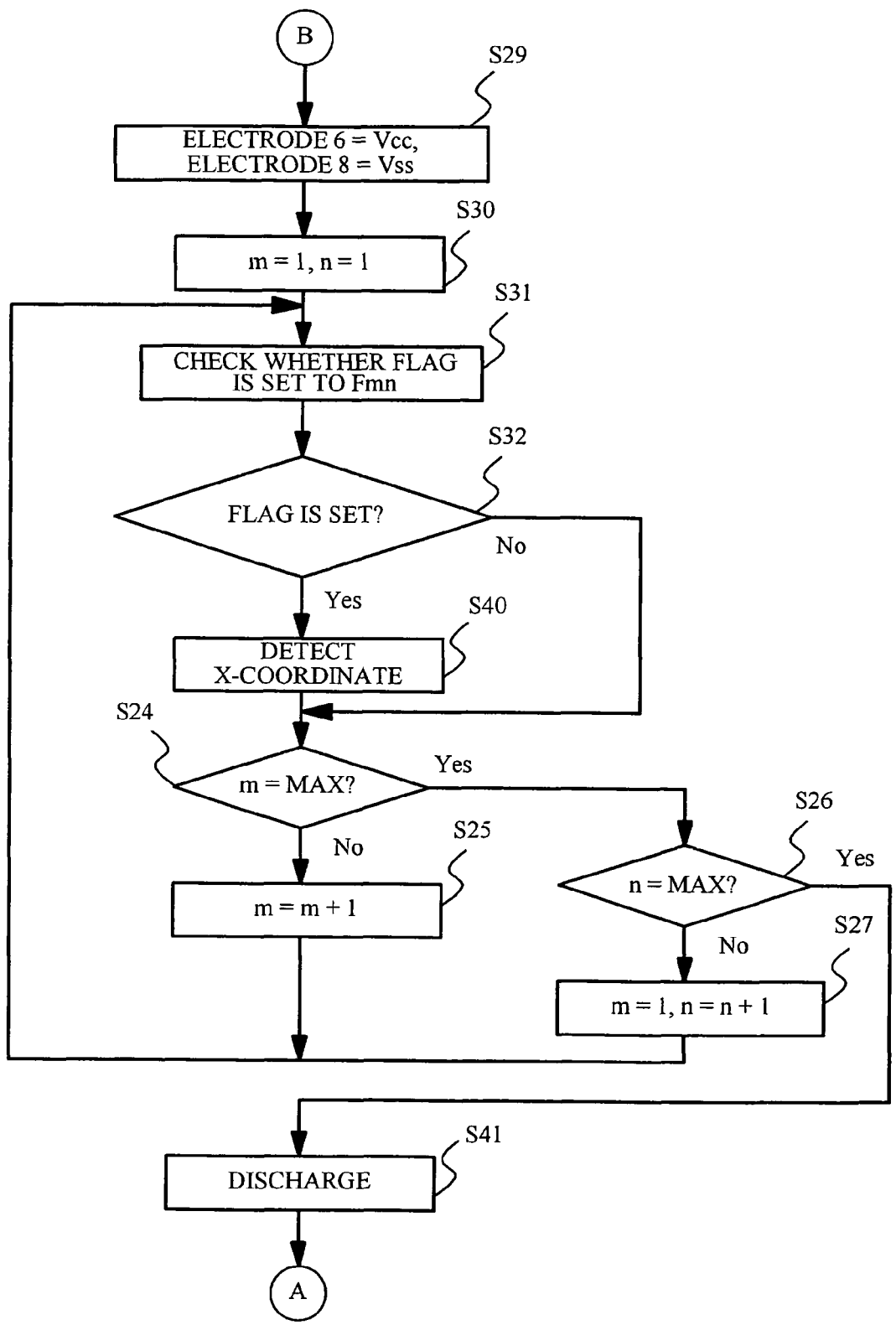
FIG. 9 is a flowchart illustrating a control of a touch panel in accordance with a variant of the first embodiment.

A description will now be given of a variant of the first embodiment. FIG. 8 and FIG. 9 are flowcharts illustrating a control of the touch panel in accordance with the variant of the first embodiment.

As illustrated in FIG. 8, steps S20, S1 through 3, and S21 are same as those illustrated in FIG. 6. When the determination is No in the step S20, or after the step S21, the process goes to the step S24. Steps S24 through S27 are same as those illustrated in FIG. 6. The process illustrated in FIG. 8 is different from the process illustrated in FIG. 6 in that the voltage application (step S22), the detection of the X-coordinate (step S23), and the discharge (step S28) are not carried out. When the determination is Yes in the step S26, the process goes to the step S29 in FIG. 9 (see "B" in the drawings).

As illustrated in FIG. 9, the control unit 16 controls the electrode control unit 18 to apply Vcc to the electrode 6, and Vss to the electrode 8 (step S29). After the step S29, the control unit 16 sets the row number m to 1 (m=1), and the column number n to 1 (n=1) (step S30). After the step S30, same process as steps S31 and S32 illustrated in FIG. 7 is performed. When the determination is Yes in the step S32, the control unit 16 detects the X-coordinate of the point where the first conductive film 2 contacts with the second conductive film 4 (step S40).

After the step S40, or when the determination is No in the step S32, the process goes to the step S24. Steps S24 through S27 are same as those illustrated in FIG. 6. When the determination is Yes in the step S26, the control unit 16 controls the electrode control unit 18 to discharge voltages applied to the electrode 6 and the electrode 8 (step S41). That is to say that the control unit 16 determines whether the first conductive film 2 contacts with the second conductive film 4 in each region Fmn as illustrated in FIG. 8, and subsequently detects the X-coordinate in each region Fmn as illustrated in FIG. 9. After the step S41, the process goes to the step S29 in FIG. 8 (see "A" in the drawings). After the step S38 in FIG. 7, the process is ended.

According to the variant of the first embodiment, voltages are discharged after the detection of the X-coordinate in each region Fmn, and subsequently voltages are discharged after detecting the Y-coordinate in each region Fmn. Thus, the number of discharges is two regardless of the number of regions. Therefore, it becomes possible to speed up the operating speed of the touch panel. Moreover, according to the variant of the first embodiment, the X-coordinate is detected in each region after a touch-ON-check in each of regions, and then the Y-coordinate is detected. Thus, it is not necessary to repeat a touch-ON-check and a detection of an X-coordinate described in steps S3 through S23 in FIG. 6. Therefore, it becomes possible to further speed up the operating speed of the touch panel.

A description was given of the process where the X-coordinate is detected before the Y-coordinate is detected in the first embodiment, but the Y-coordinate may be detected before the X-coordinate is detected. That is to say that it becomes possible to reduce the number of discharges and speed up the operating speed of the touch panel by discharging voltages after the detection of one of the X-coordinate and the Y-coordinate, and subsequently detecting the other one of the X-coordinate and the Y-coordinate.

As illustrated in FIG. 1B and FIG. 1C, a description was given by using a case where the first conductive film 2 is divided into sixteen regions, but the first conductive film 2 may be divided into regions more or less than sixteen. In addition, the number of rows may be different from the number of columns. In FIG. 3, regions in a same row are coupled to one multiplexer and one pull-down resistor, but the method for coupling is not limited to this. For example, regions in a same column may be coupled to one multiplexer and one pull-down resistor.

Second Embodiment

Figure 10A:
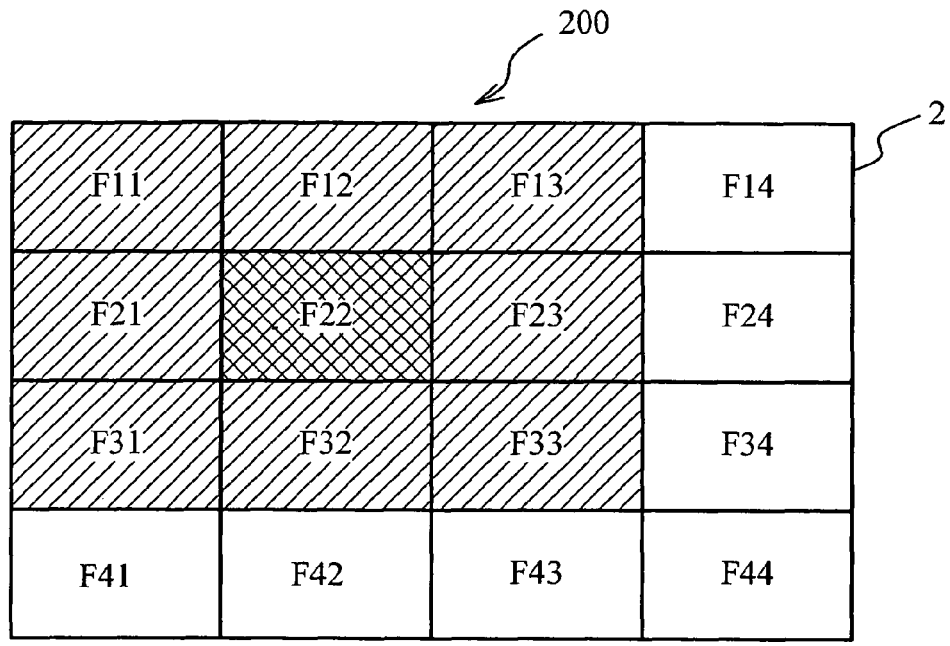
FIG. 10A and FIG. 10B are plane views illustrating a touch panel in accordance with a second embodiment.
Figure 10B:
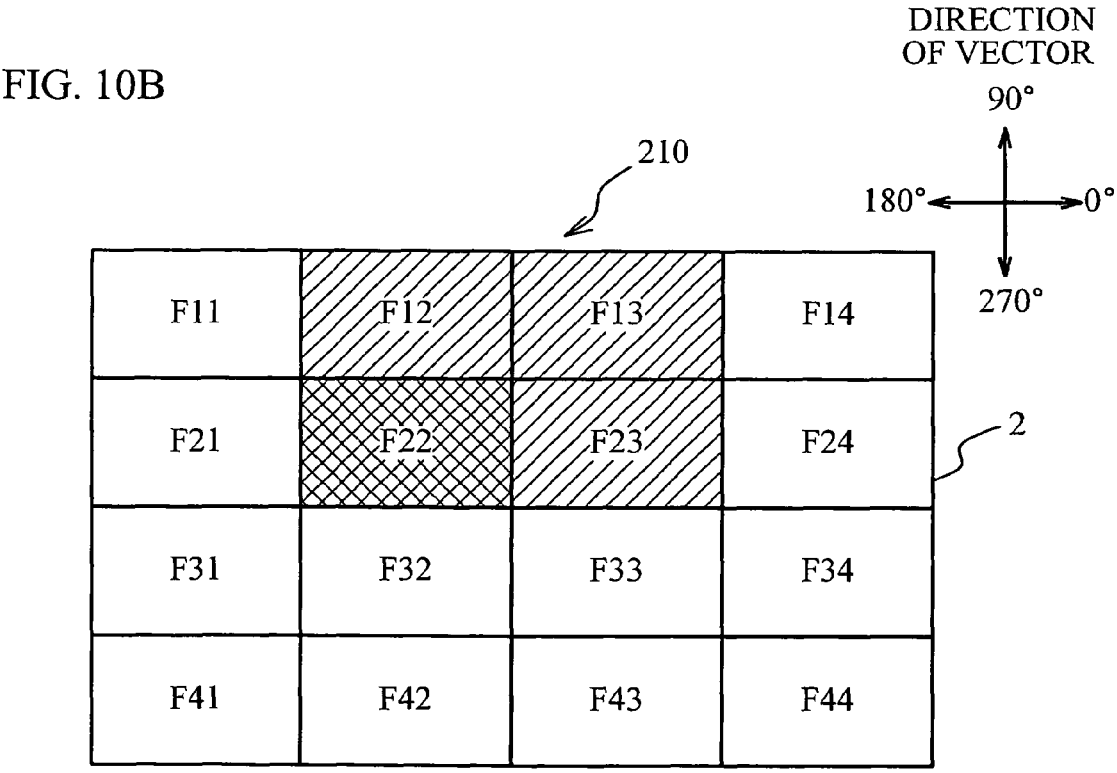

A description will now be given of a second embodiment. FIG. 10A is a plane view illustrating a touch panel 200 in accordance with the second embodiment. FIG. 10B is a plane view illustrating a touch panel 210 in accordance with the variant of the second embodiment. In FIG. 10B, a direction of a vector described later is also illustrated. A description will be given of the embodiment in FIG. 10A.

In a multi-point input touch panel, there is a case that a single-point input mode is used. The touch panel 200 is in a single-point input mode. In the touch panel, there is a case that the drawing is performed on the touch panel by sliding a finger touching the touch panel. In such drawing mode, it is desired to speed up the operating speed of the touch panel for smooth drawing. A description on this point will be given with reference to FIGS. 10A and 10B.

As illustrated in FIG. 10A, the first conductive film 2 of the touch panel 200 is divided into regions F11 through F44. For example, in the drawing mode, when the region F22 is touched, a finger moves from the region F22 and also touches a region neighboring regions the region F22. At this time, if the coordinate detection is performed from the region F11 sequentially, the processing speed of the touch panel to the movement of the finger becomes slow, and the smooth drawing may be difficult.

In the touch panel 200 in accordance with the second embodiment, when the first conductive film 2 contacts with the second conductive film 4 in the region F22 illustrated with hatching, the contact of the first conductive film 2 with the second conductive film 4 is determined in the region F22 and regions F11 through F13, F21, F23 and F31 through F33 neighboring the region F22 prior to other regions.

Figure 11:
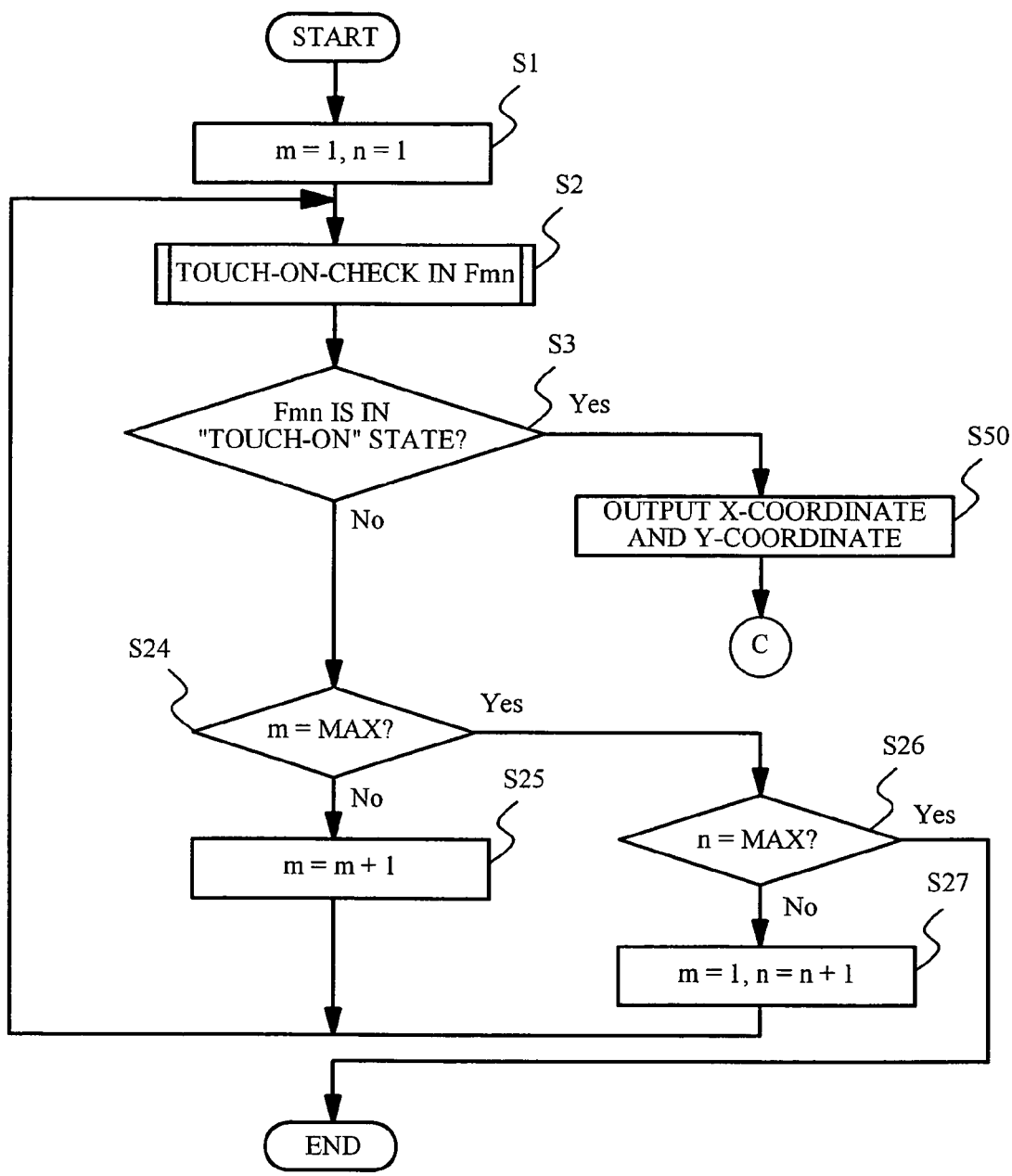
FIG. 11 is a flowchart illustrating a control of the touch panel in accordance with the second embodiment.
Figure 12:
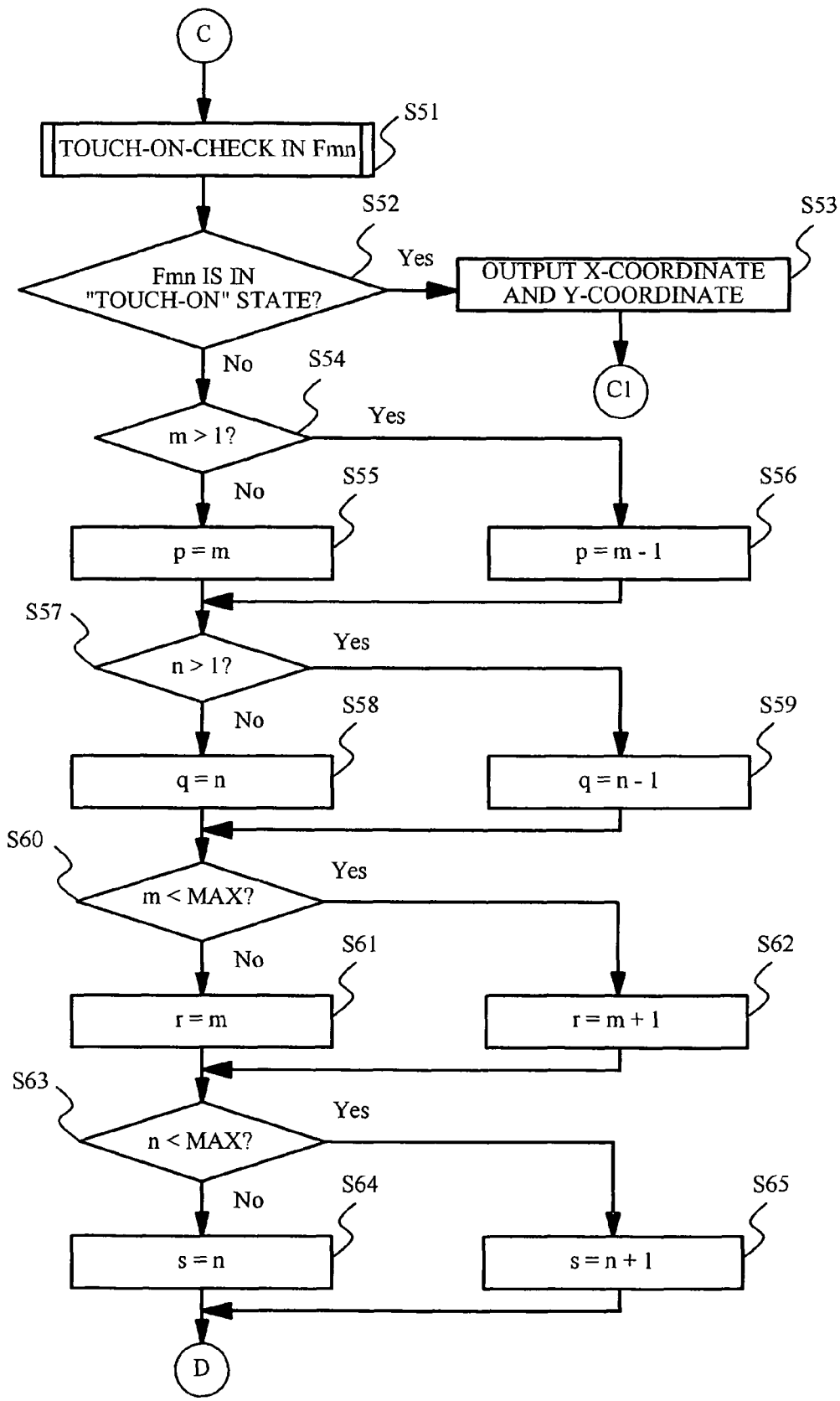
FIG. 12 is a flowchart illustrating the control of the touch panel in accordance with the second embodiment.
Figure 13:
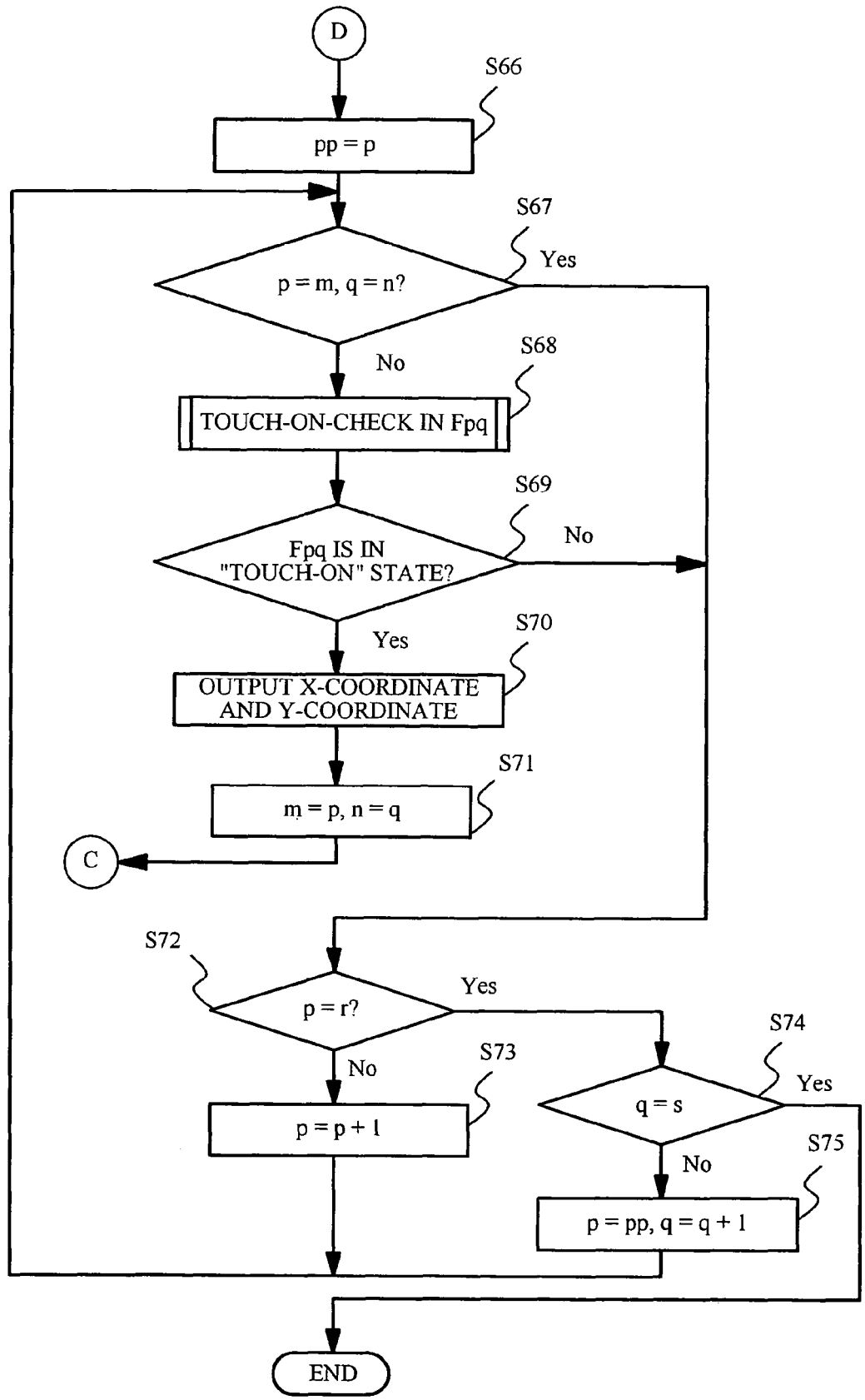
FIG. 13 is a flowchart illustrating the control of the touch panel in accordance with the second embodiment.

A description will now be given of a behavior of the touch panel 200 in accordance with the second embodiment in more detail with reference to flowcharts. FIG. 11 through FIG. 13 are flowcharts illustrating a control of the touch panel in accordance with the second embodiment.

Steps S1 through S3 and steps S24 through S27 illustrated in FIG. 11 are same as those described before. When the determination is No in the step S3, the process goes to the step S24, and when the determination is Yes in the step S26, the process is ended. When the determination is Yes in the step S3, which means a case that the first conductive film 2 contacts with the second conductive film 4 in the region Fmn, the control unit 16 outputs the X-coordinate and the Y-coordinate of the point where the first conductive film 2 contacts with the second conductive film 4 in the region Fmn (step S50). The output of the X-coordinate and the Y-coordinate is carried out according to the process from the step S4 to the step S9 illustrated in FIG. 4 for example.

After the step S50, the process goes to the step S51 in FIG. 12 (see "C" in the drawings). The control unit 16 checks whether the first conductive film 2 contacts with the second conductive film 4 in the region Fmn which is determined to be in a "touch-ON" state in the step S3 (step S51). After the step S51, the control unit 16 determines whether the first conductive film 2 contacts with the second conductive film 4 (step S52). When the determination is Yes in the step S52, the control unit 16 outputs the X-coordinate and the Y-coordinate of the point where the first conductive film 2 contacts with the second conductive film 4 (step S53). That is to say that when the control unit 16 outputs coordinates of the point where the first conductive film 2 contacts with the second conductive film 4 in the step S50, the control unit 16 carries out a touch-ON-check and a coordinate detection in the region Fmn where coordinates are outputted in the step S50 in subsequent steps to the step S50 where coordinates are outputted. After the step S53, the process goes to the step S76 in FIG. 14 (see "C1" in FIG. 12 and FIG. 14). The process after going to C1 will be described in a variant of the second embodiment described later.

When the determination is No in the step S52, the control unit 16 determines whether m is larger than 1 (step S54). When the determination is No, the control unit 16 sets p to m (p=m) (step S55). When a region in the first row is determined to be in a "touch-ON" state in the step S3 in FIG. 11, the determination in the step S54 becomes No. When the determination is Yes, the control unit 16 sets p to m−1 (p=m−1) (step S56).

After the step S55 or the step S56, the control unit 16 determines whether n is larger than 1 (step S57). When the determination is No, the control unit 16 sets q to n (q=n) (step S58). When the region in the first column is determined to be in a "touch-ON" state in the step S3 in FIG. 11, the determination in the step S57 becomes No. When the determination is Yes, the control unit 16 sets q to n−1 (q=n−1) (step S59).

After the step S58 or S59, the control unit 16 determines whether m is smaller than MAX (step S60). Here, MAX is "4" which is a maximum number of the row number. When the determination is No, the control unit 16 sets r to m (r=m) (step S61). When the region in the fourth row is determined to be in a "touch-ON" state in the step S3 in FIG. 11, the determination in the step S60 becomes No. When the determination is Yes, the control unit 16 sets r to m+1 (r=m+1) (step S62).

After the step S61 or S62, the control unit 16 determines whether n is smaller than MAX (step S63). Here, MAX is "4" which is a maximum number of the column number. When the determination is No in the step S63, the control unit 16 sets s to n (s=n) (step S64). When the region in the fourth column is determined to be in a "touch-ON" state in the step S3 in FIG. 11, the determination in the step S63 becomes No. When the determination is Yes in the step S63, the control unit 16 sets s to n+1 (s=n+1) (step S65). After the step S65, the process goes to the step S66 in FIG. 13 (see "D" in the drawings).

The control unit 16 sets pp to p (pp=p) (step S66). That is to say that the control unit 16 memorizes the value of p set in the step S55 or S56. After the step S66, the control unit 16 determines whether p is equal to m (p=m) and q is equal to n (q=n) (step S67). When the determination is No, the control unit 16 checks whether the first conductive film 2 contacts with the second conductive film 4 in the region Fpq, which means that the control unit 16 carries out a touch-ON-check (step S68). After the step S68, the control unit 16 determines whether the first conductive film 2 contacts with the second conductive film 4 in the region Fpq (step S69). That is to say that the control unit 16 determines whether the first conductive film 2 contacts with the second conductive film 4 in the region Fpq neighboring the region Fmn.

When the determination is Yes in the step S69, the control unit 16 outputs the X-coordinate and the Y-coordinate of the point where the first conductive film 2 contacts with the second conductive film 4 in the region Fpq (step S70). That is to say that the control unit 16 outputs coordinates in the region Fpq neighboring the region Fmn. After the step S70, the control unit 16 sets m to p (m=p), and n to q (n=q). After the step S71, the process goes back to the step S51 in FIG. 13 (see "C" in the drawings). In other words, when the control unit 16 outputs coordinates in the region Fpq neighboring the region Fmn, it does not output coordinates in regions other than the region Fpq.

When the determination is Yes in the step S67, or when the determination is No in the step S69, the control unit 16 determines whether p is equal to r (p=r) (step S72). When the determination is No, the control unit 16 sets p to p+1 (p=p+1) (step S73). That is to say that the row of the region Fpq becomes a one subsequent row. After the step S73, the process goes back to the step S67. This means that the control unit 16 performs a process from the step S67 in a region of which the row is one-subsequent to that of the region Fpq which is determined whether being in a "touch-ON" state in the step S69.

When the determination is Yes in the step S72, the control unit 16 determines whether q is equal to s (q=s) (step S74). When the determination is No, the control unit 16 sets p to pp (p=pp) and q to q+1 (q=q+1) (step S75). Here, pp is the row number p of the region Fpq which is determined whether being in a "touch-ON" state in the step S69 (see steps S66 and S69).

After the step S75, the process goes back to the step S67. In other words, the control unit 16 performs the process from the step S67 in the region Fpq of which the row and the column are same as and one-subsequent to the row and the column of the region which is determined whether being in a "touch-ON" state in the step S69 respectively. Above process is repeated, and when the determination is Yes in the step S74, the process is ended. This means that the process is ended after a touch-ON-check is carried out in regions neighboring the region Fmn in which coordinates are output in the step S50 in FIG. 11.

A description will be given of the above process more specifically with reference to FIG. 10A. For example, when coordinates are output in the region F22 (the step S50 in FIG. 11), the control unit 16 determines whether the first conductive film 2 contacts with the second conductive film 4 in the region F11 (steps S68 and S69 in FIG. 13). When the determination is Yes in the step S69, coordinates are output in the region F11, and the process goes back to a process in FIG. 12. When the determination is No, the control unit 16 performs the process from the step S67 in the region F21 (steps S72 and S73). Steps S67 through S73 are repeated, and when the process in the region F33 is carried out, the process is ended. This means that the control unit 16 detects coordinates in the region F22 and regions neighboring the region F22, but does not detect coordinates in other regions.

According to the second embodiment, when coordinates are output in the region Fmn (the step S50 in FIG. 11), in the following steps (from the step S51 in FIG. 12) the control unit 16 detects coordinates of the point where the first conductive film 2 contacts with the second conductive film 4 in the region Fmn where coordinates are output and the region Fpq neighboring the region Fmn (steps S68 through S70 in FIG. 13). Moreover, when the control unit 16 outputs coordinates in the region Fmn (the step S50 in FIG. 11), it does not carry out a touch-ON-check in regions other than the region Fmn and the region Fpq neighboring the region Fmn (steps S72 and S74 in FIG. 13). This means that the control unit 16 does not detect coordinates in regions other than the region Fmn and the region Fpq neighboring Fmn. Moreover, when coordinates are output in the region Fpq, which means a case that the determination is Yes in the step S69, the control unit 16 does not detect coordinates in regions other than the region where a touch-ON-check is already carried out, in the region Fmn and regions neighboring Fmn. This means that the touch panel 200 is a single point input touch panel.

As described above, it becomes possible to speed up the operating speed of the touch panel compared to a case that a coordinate detection is carried out in all divided regions sequentially because coordinates are detected in the region where the coordinate is detected previously and its neighboring regions prior to other regions. Moreover, the coordinate detection is not carried out in regions other than region where a touch-ON-check is already carried out when coordinates are detected. As a result, it becomes possible to speed up the operating speed of the touch panel, and the smooth drawing to the input becomes possible in a drawing mode. In addition, the touch panel 200 in accordance with the second embodiment can handle a fine drawing.

A description will be given of a variant of the second embodiment. As illustrated in FIG. 10B, think a case where the first conductive film 2 contacts with the second conductive film 4 in the region F22 illustrated with hatching in the drawing, then a finger pressing the touch panel slides, and the first conductive film 2 contacts with the second conductive film 4 also in the region neighboring the region F22. In a touch panel 210 in accordance with the variant of the second embodiment, when a finger presses the touch panel with sliding from the region F22 to the region F13, it is determined whether the first conductive film 2 contacts with the second conductive film 4 in the region F22 and regions F12, F13, and F23 that are along the direction from the region F22 to the region F13. Regions F12, F13 and F23 are illustrated with diagonal lines.

A description will now be given of the control of the touch panel in accordance with the variant of the second embodiment in more detail with reference to flowcharts. FIG. 14 through FIG. 22 are flowcharts illustrating the control of the touch panel in accordance with the variant of the second embodiment. The control illustrated in FIG. 11 is performed also in the variant of the second embodiment.

Figure 14:
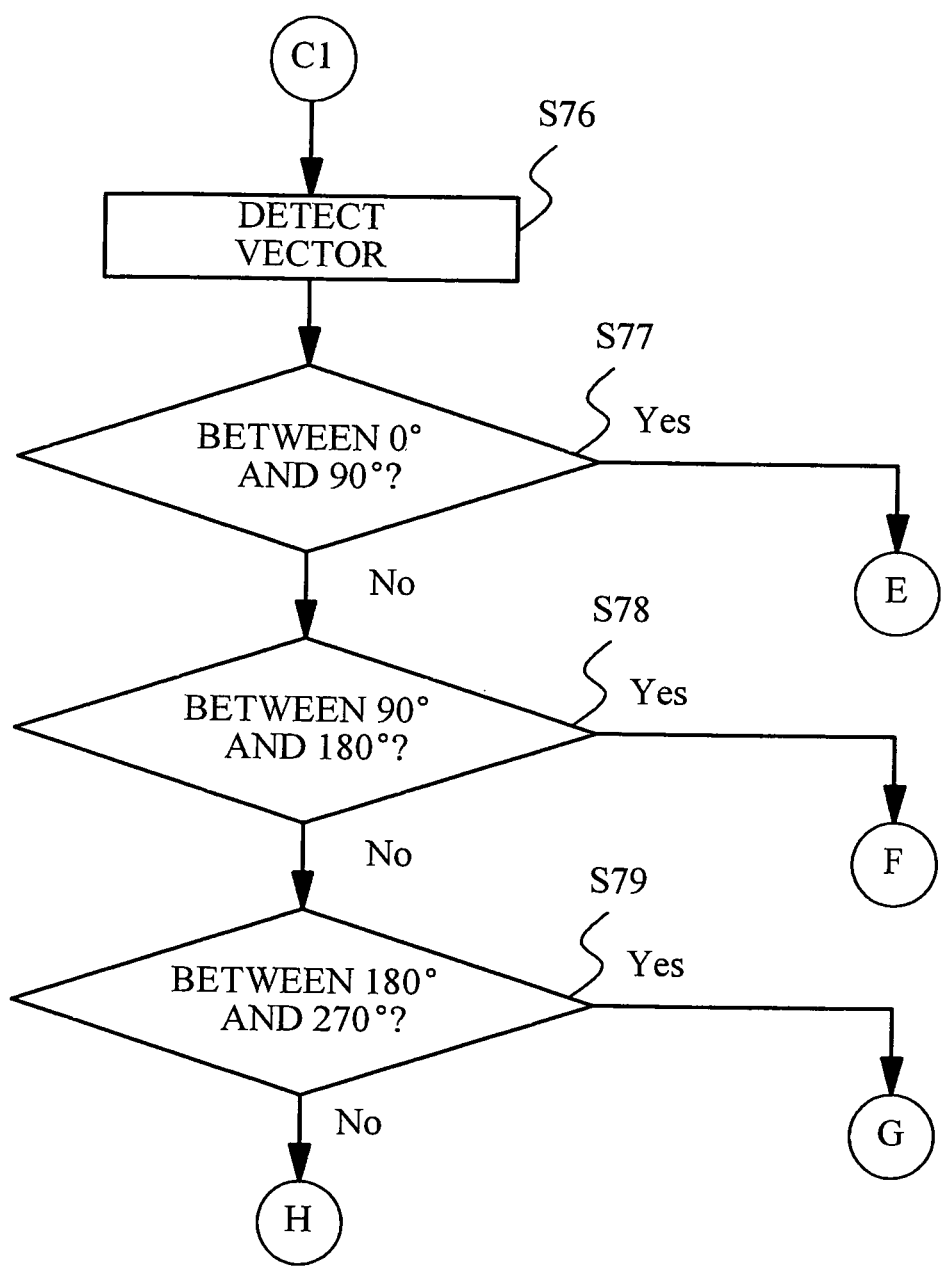
FIG. 14 is a flowchart illustrating a control of a touch panel in accordance with a variant of the second embodiment.

As illustrated in FIG. 14 and FIG. 12, after the step S53 in FIG. 12, the process goes to the step S76 in FIG. 14 (see "C1" in the drawings). The control unit 16 detects a vector heading from the region Fmn to the region which neighbors Fmn and where coordinates are output (step S76). In other words, the control unit 16 determines a direction based on the output of coordinates in the region Fmn and the neighboring region.

After the step S76, the control unit 16 determines whether the direction of the vector determined in the step S76 is between 0° and 90° (step S77). When the determination is Yes, the process goes to the step S80 in FIG. 15 (see "E" in the drawings).

When the determination is No, the control unit 16 determines whether the direction of the vector determined in the step S76 is between 90° and 180° (step S78). When the determination is Yes, the process goes to the step S80 in FIG. 17 (see "F" in the drawings).

When the determination is No, the control unit 16 determines whether the direction of the vector determined in the step S76 is between 180° and 270° (step S79). When the determination is Yes, the process goes to the step S80 in FIG. 19 (see "G" in the drawings).

Figure 21:
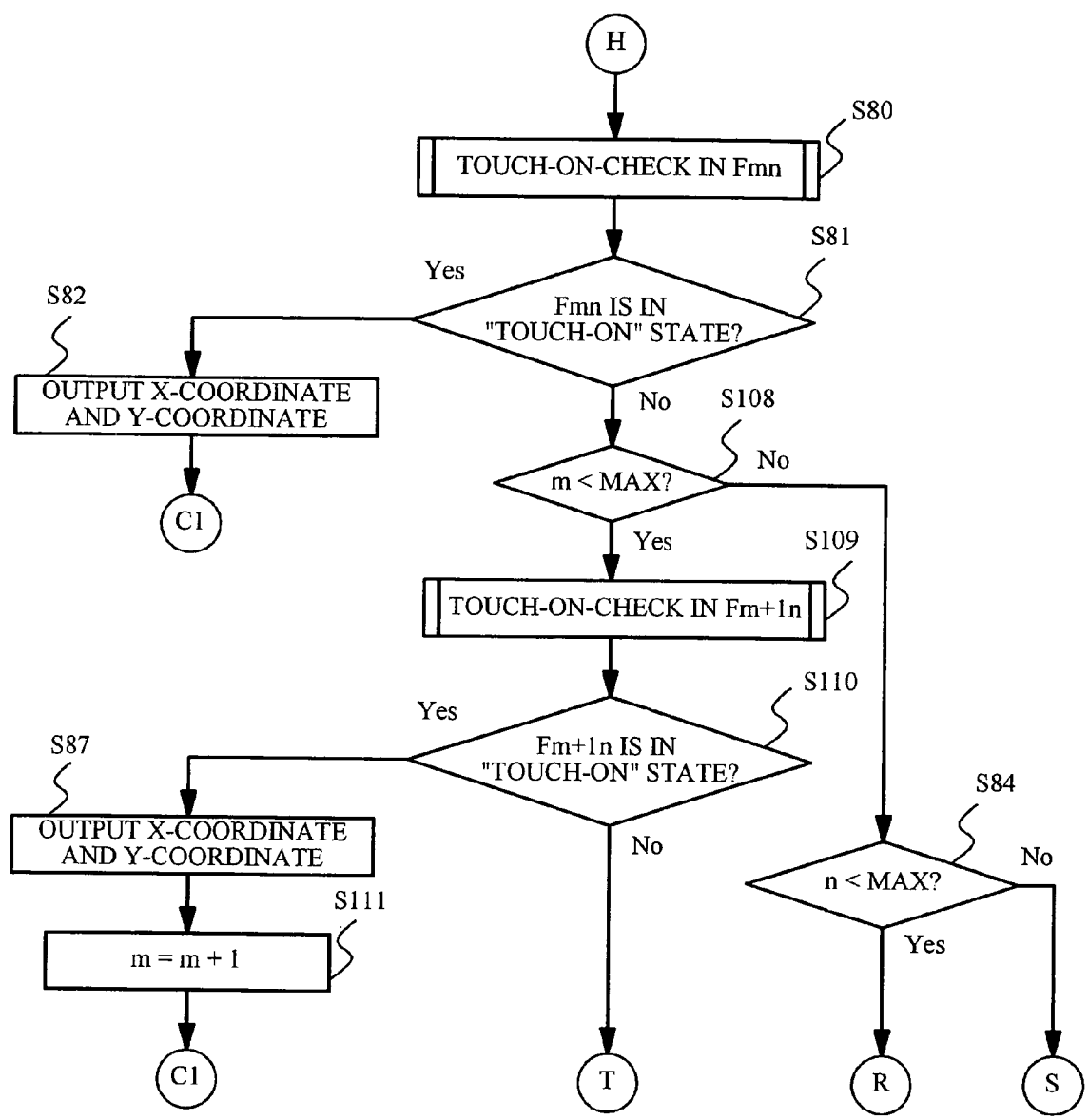
FIG. 21 is a flowchart illustrating the control of the touch panel in accordance with the variant of the second embodiment.

When the determination is No, the control unit 16 determines that the direction of the vector determined in the step S76 is between 270° and 360°, and goes to the step S80 in FIG. 21(see "H" in the drawings).

Figure 15:
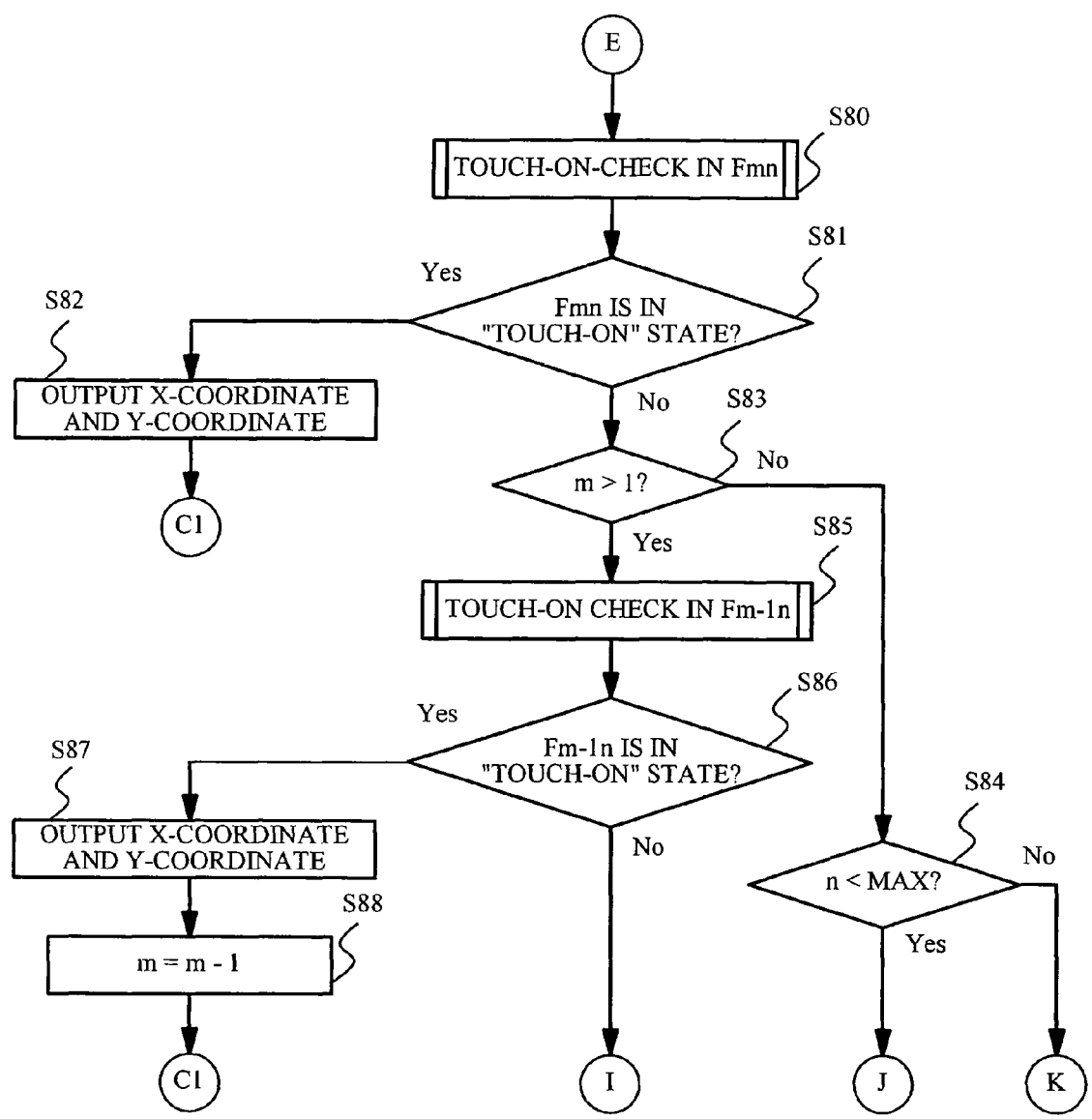
FIG. 15 is a flowchart illustrating the control of the touch panel in accordance with the variant of the second embodiment.
Figure 16:
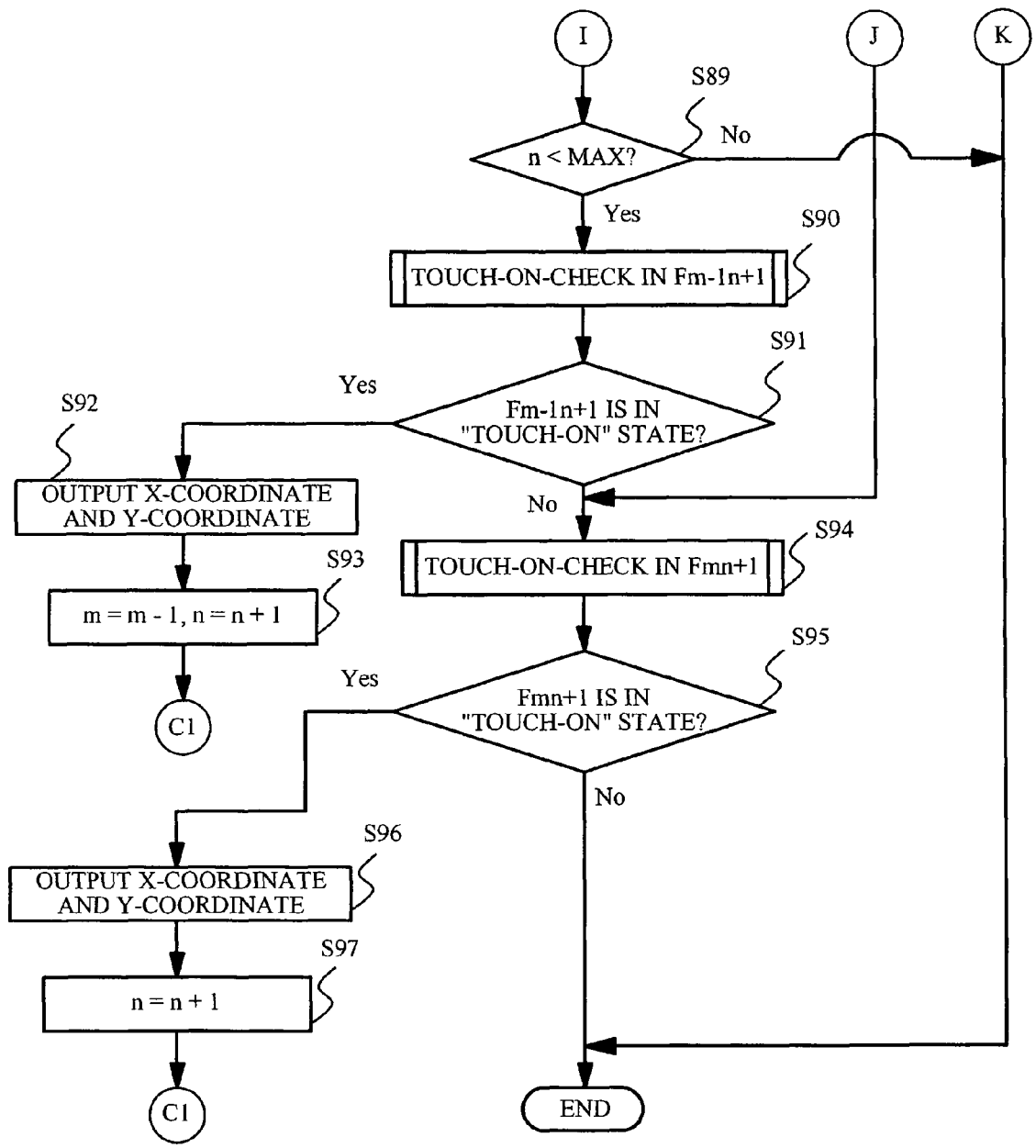
FIG. 16 is a flowchart illustrating the control of the touch panel in accordance with the variant of the second embodiment.

A description will be given of a case that the direction of the vector is between 0° and 90°. FIG. 15 and FIG. 16 are flowcharts illustrating a control in a case where the direction of the vector is between 0° and 90°.

As illustrated in FIG. 15, the control unit 16 carries out a touch-ON-check in the region Fmn where coordinates are output in the step S50 in FIG. 11 (step S80). After the step S81, the control unit 16 determines whether the region Fmn is in a "touch-ON" state. When the determination is Yes, the control unit 16 outputs the X-coordinate and the Y-coordinate (step S82). After the step S82, the process goes back to the step S66 in FIG. 13 (see "D" in the drawing).

When the determination is No in the step S81, the control unit 16 is m is larger than 1 (step S83). When the determination is No, which means that the region Fmn is located in the first row, the control unit 16 determines whether n is smaller than MAX (step S84). When the determination is Yes, the process goes to the step S94 in FIG. 16 described later (see "J" in the drawings). When the determination is No, which means that the region Fmn is located in the fourth column, the process is ended (see "K" in the drawing and FIG. 16).

When the determination is Yes in the step S83, the control unit 16 carries out a touch-ON-check in the region Fm−1n (step S85). That is to say that the control unit 16 carries out a touch-ON-check in the region of which the row is one-previous to that of the region Fmn. After the step S85, the control unit 16 determines whether the region Fm−1n is in a "touch-ON" state (step S86).

When the determination is Yes, the control unit 16 outputs the X-coordinate and the Y-coordinate (step S87). After the step S87, the control unit 16 sets m to m−1 (m=m−1) (step S88). After the step S88, the process goes back to the step S66 in FIG. 13 (see "D" in the drawing). When the determination is No in the step S86, the process goes to the step S89 in FIG. 16 (see "I" in the drawing).

As illustrated in FIG. 16, when the determination is No in the step S86, the control unit 16 determines whether n is smaller than MAX (step S89). When the determination is No, the process is ended. When the determination is Yes, the control unit 16 carries out a touch-ON-check in the region Fm−1n+1 (step S90). This means that the control unit 16 carries out a touch-ON-check in the region of which the row and the column are one-previous to and one-subsequent to the row and the column of region Fmn respectively. The control unit 16 determines whether the region Fm−1n+1 is in a "touch-ON" state (step S91).

When the determination is Yes, the control unit 16 outputs the X-coordinate and the Y-coordinate (step S92). After the step S92, the control unit 16 sets m to m−1 (m=m−1) and n to n+1 (n=n+1) (step S93). After the step S93, the process goes back to the step S76 in FIG. 14 (see "C1" in the drawings).

When the determination is No in the step S91, the control unit 16 carries out a touch-ON-check in the region Fmn+1 (step S94). When the determination is Yes in the step S84 in FIG. 15, the control unit 16 carries out the process of the step S94. That is to say that the control unit 16 carries out a touch-ON-check in the region of which the column is one-subsequent to that of region Fmn. After the step S94, the control unit 16 determines whether the region Fmn+1 is in a "touch-ON" state (step S95).

When the determination is Yes, the control unit 16 outputs the X-coordinate and the Y-coordinate (step S96). After the step S96, the control unit 16 sets n to n+1 (n=n+1) (step S97). After the step S97, the process goes back to the step S76 in FIG. 14 (see "C1" in the drawings). When the determination is No in the step S95, the process is ended.

Figure 17:
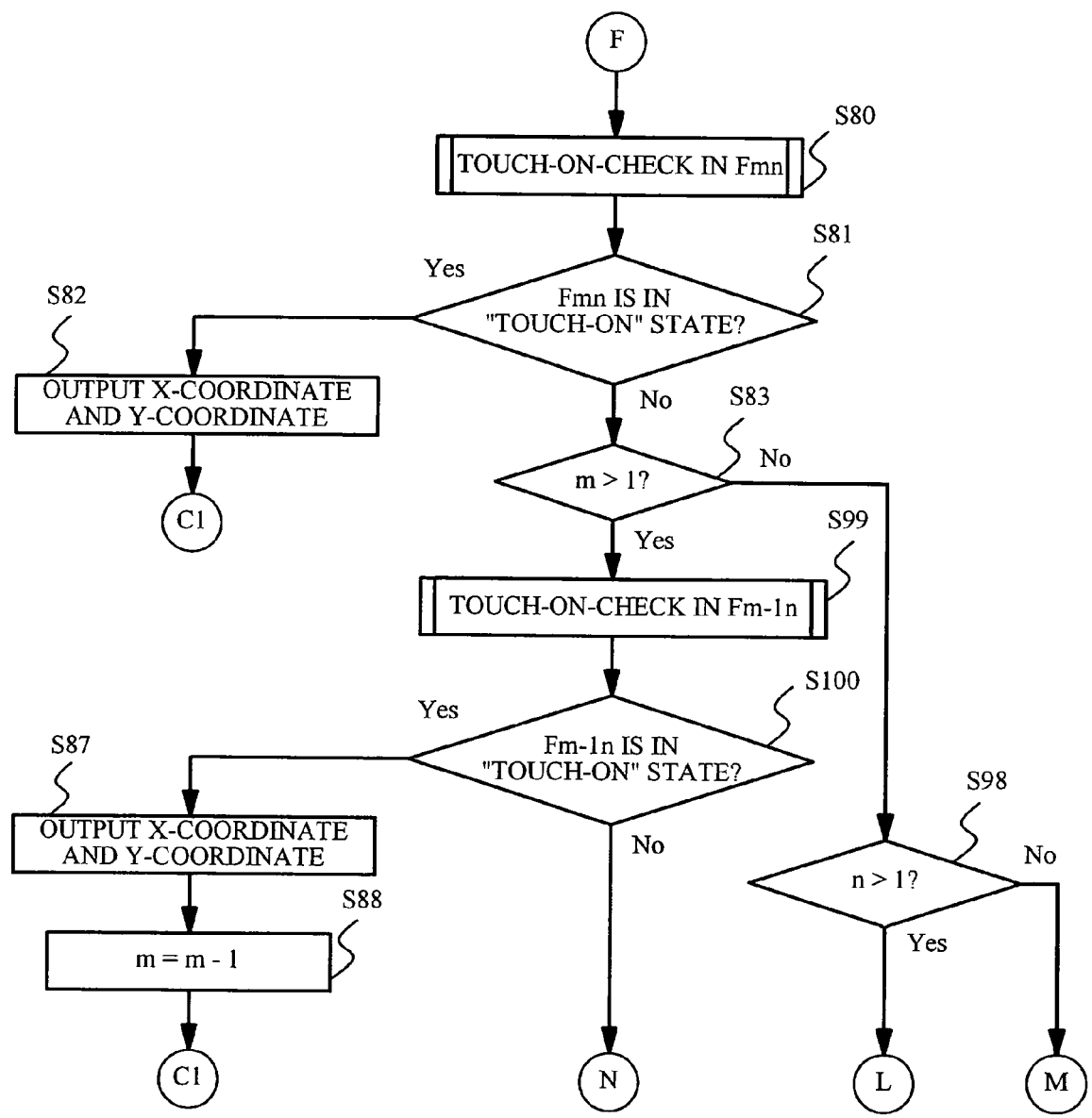
FIG. 17 is a flowchart illustrating the control of the touch panel in accordance with the variant of the second embodiment.
Figure 18:
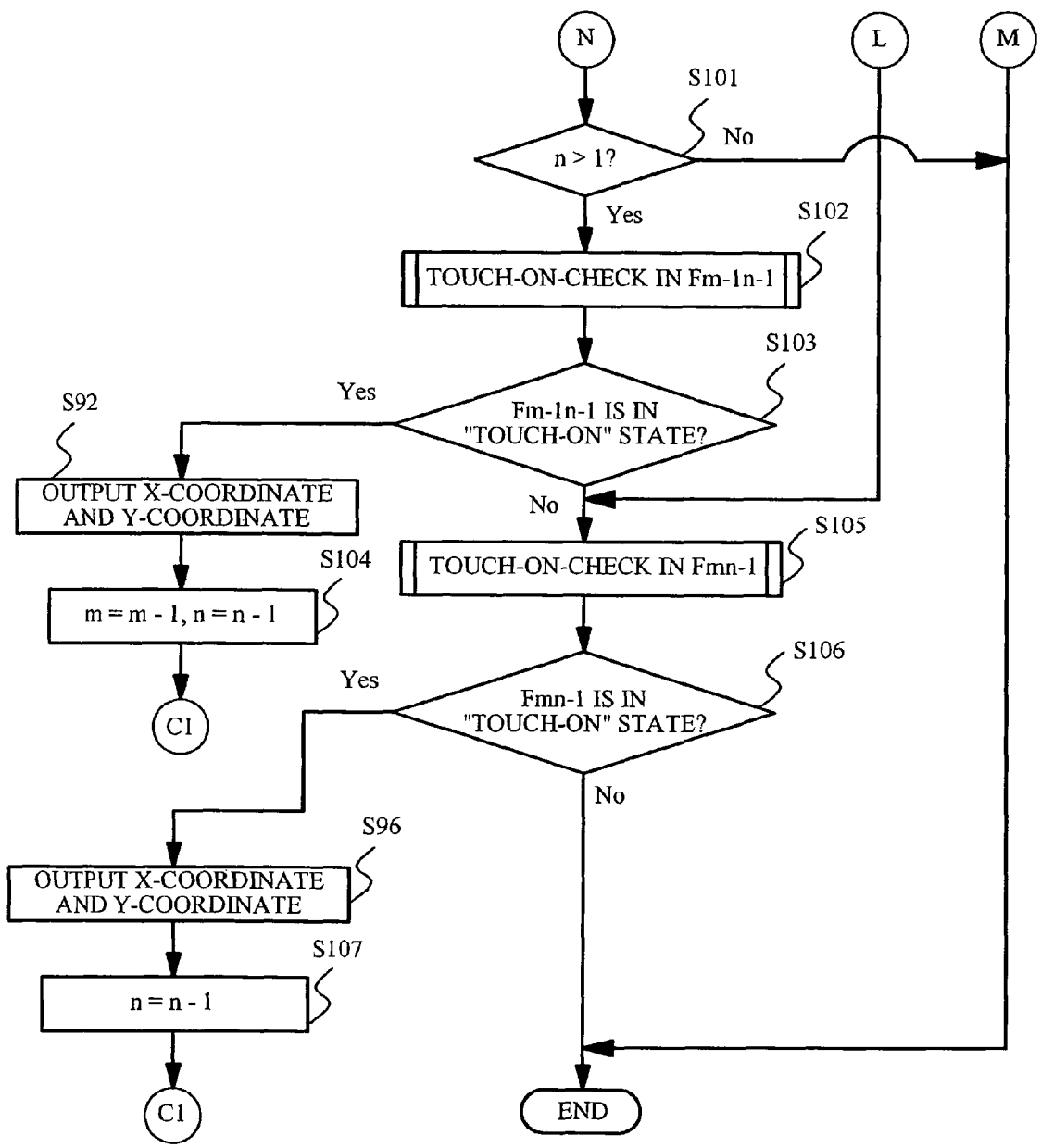
FIG. 18 is a flowchart illustrating the control of the touch panel in accordance with the variant of the second embodiment.

A description will now be given of a case that the direction of the vector is between 90° and 180°. FIG. 17 and FIG. 18 are flowcharts illustrating the control in a case where the direction of the vector is between 90° and 180°. A description will be omitted of the process same as the process illustrated in FIG. 15 and FIG. 16.

When the determination is No in the step S83 in FIG. 17, the control unit 16 determines whether n is smaller than 1 (step S98). When the determination is Yes, the process goes to the step S105 in FIG. 18 described later (see "L" in the drawing). When the determination is No, the process is ended (see "M" in the drawing and FIG. 18).

When the determination is Yes in the step S83, the control unit 16 carries out a touch-ON-check in the region Fm−1n (step S99), and determines whether the region Fm−1n is in a "touch-ON" state (step S100). That is to say that the control unit 16 carries out a touch-ON-check in the region of which the row is one-previous to that of the region Fmn. When the determination is Yes, steps S87 and S88 are executed, and the process goes back to the step S76 in FIG. 14. When the determination is No, the process goes to the step S101 in FIG. 18 (see "N" in the drawing).

As illustrated in FIG. 18, after the step S100, the control unit 16 determines whether n is larger than 1 (step S101). When the determination is No, the process is ended. When the determination is Yes, the control unit 16 carries out a touch-ON-check in the region Fm−1n−1 (step S102), and determines whether the region Fm−1n−1 is in a "touch-ON" state (step S103). That is to say that the control unit 16 carries out a touch-ON-check in the region of which the row and the column are one previous to those of the region Fmn.

When the determination is Yes in the step S103, the control unit 16 outputs coordinates (step S92), and sets m to m−1 (m=m−1) and n to n−1 (n=n−1) (step S104). Then, the process goes back to the step S76 in FIG. 14 (see "C1" in the drawing).

When the determination is No in the step S103, the control unit 16 carries out a touch-ON-check in the region Fmn−1 (step S105), and determines whether the region Fmn−1 is in a "touch-ON" state (step S106). That is to say that the control unit 16 carries out a touch-ON-check in the region of which the column is one-previous to that of the region Fmn. More specifically, when coordinates are output in the region F22 in the step S50 in FIG. 11 for example, a touch-ON-check is carried out in the region F21 in the step S105. When the determination is Yes in the step S106, the control unit 16 outputs coordinates (step S96), and sets n to n−1 (step S107). When the determination is No in the step S106, the process is ended.

Figure 19:
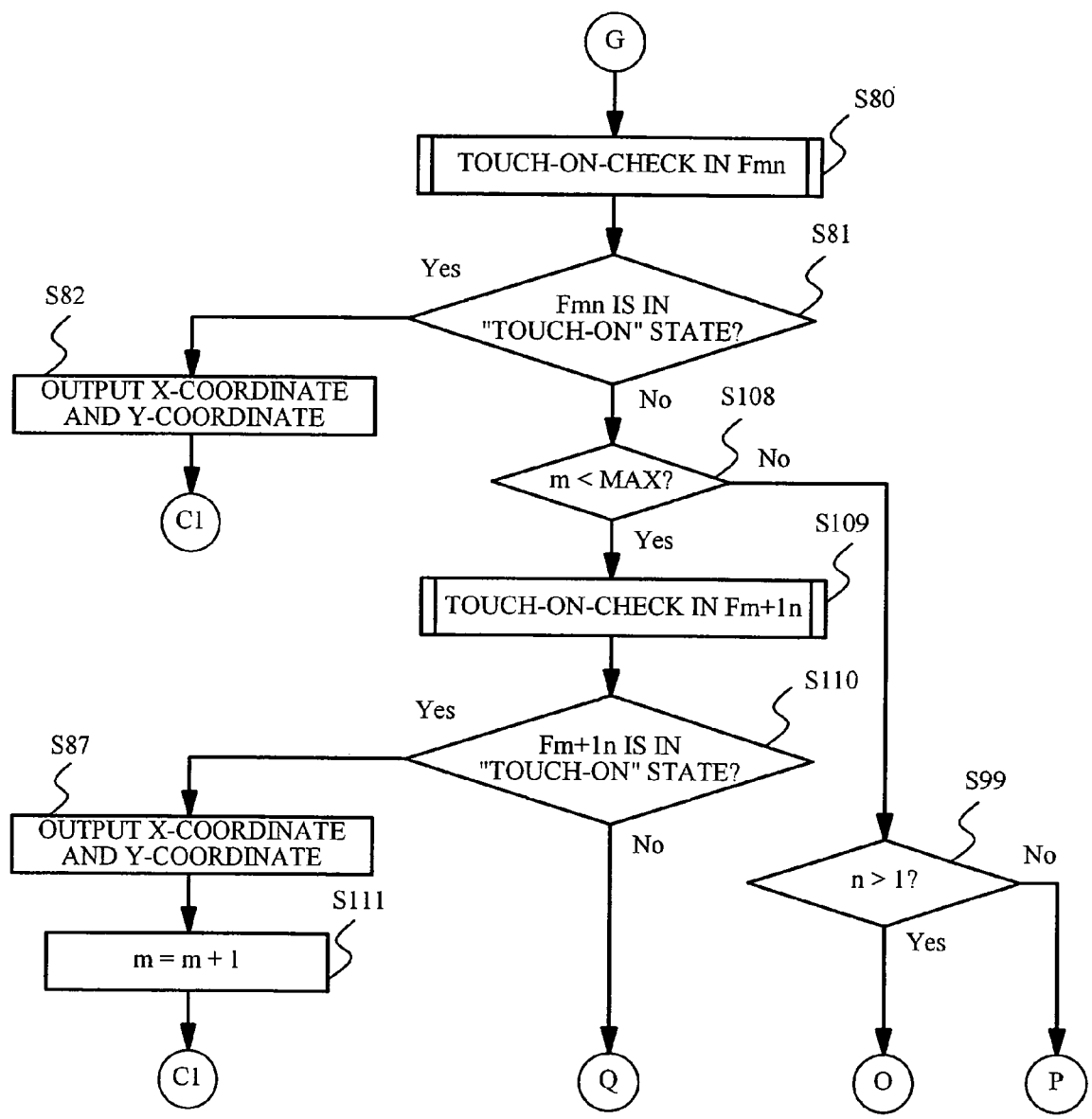
FIG. 19 is a flowchart illustrating the control of the touch panel in accordance with the variant of the second embodiment.
Figure 20:
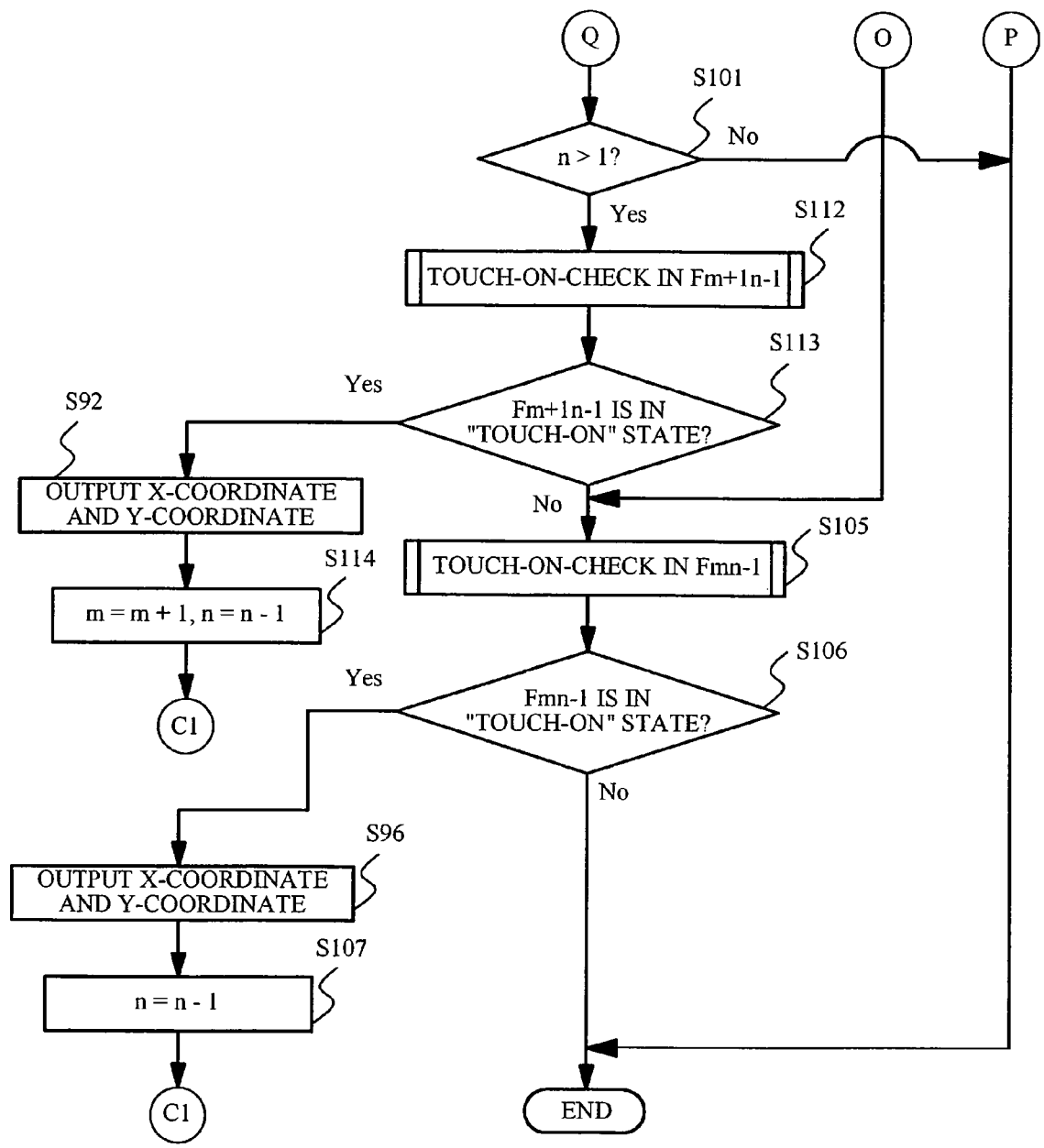
FIG. 20 is a flowchart illustrating the control of the touch panel in accordance with the variant of the second embodiment.

A description will now be given of a case that the direction of the vector is between 180° and 270°. FIG. 19 and FIG. 20 are flowcharts illustrating a control in a case where the direction of the vector is between 180° and 270°. A description will be omitted of the process same as the process described above.

As illustrated in FIG. 19 and FIG. 20, when the direction of the vector is between 180° and 270°, the control unit 16 carries out a touch-ON-check in the region Fm+1n of which the row is one-subsequent to that of the region Fmn (step S109 in FIG. 19), the region Fm+1n−1 of which the row and the column are one-subsequent to and one-previous to those of the region Fmn respectively (step S112 in FIG. 20), and the region Fmn−1 of which the column is one-previous to that of the region Fmn (step S105 in FIG. 20).

Figure 22:
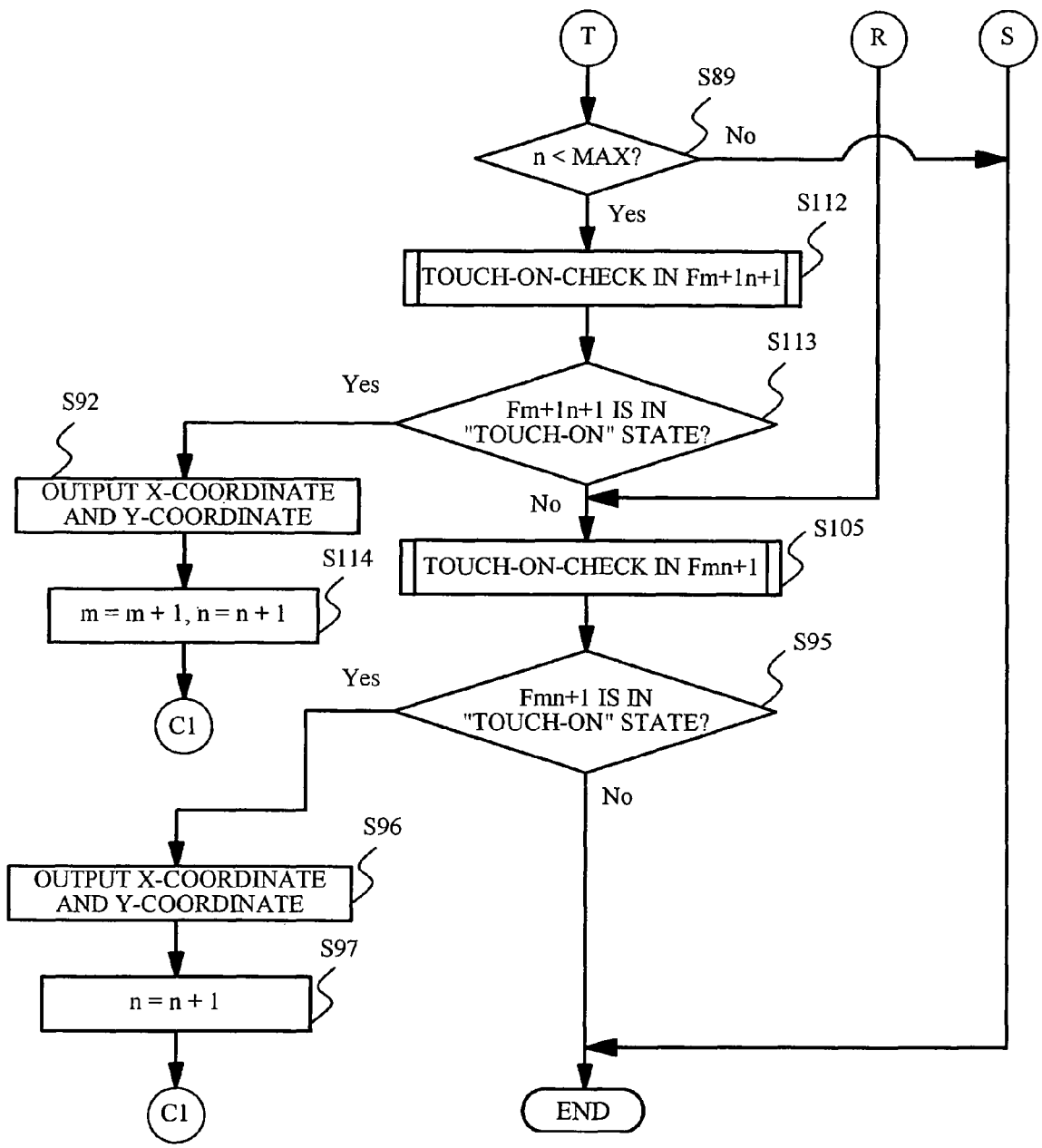
FIG. 22 is a flowchart illustrating the control of the touch panel in accordance with the variant of the second embodiment.

A description will now be given of a case that the direction of the vector is between 270° and 360°. FIG. 21 and FIG. 22 are flowcharts illustrating a control in a case where the direction of the vector is between 270° and 360°. A description will be omitted of the process same as the process described above.

As illustrated in FIG. 21 and FIG. 22, when the direction of the vector is between 270° and 360°, the control unit 16 carries out a touch-ON-check in the region Fm+1n of which the row is one-subsequent to that of the region Fmn (step S109 in FIG. 21), the region Fm+1n+1 of which the row and the column is one-subsequent to those of the region Fmn (step S112 in FIG. 22), and the region Fmn+1 of which the column is one-subsequent to that of the region Fmn (step S105 in FIG. 22).

Above process will be described more specifically with reference to FIG. 10B. When coordinates are output in the region F22 (the step S50 in FIG. 11) and coordinates are output in the region F33 (step S70 in FIG. 13) for example, the control unit 16 calculates a direction based on the operation of outputting coordinates (step S76 in FIG. 14). Here, the direction is between 270° and 360° (No in the step S79). The control unit 16 determines whether the first conductive film 2 contacts with the second conductive film 4 in the region F22 (steps S80 and S81 in FIG. 21). When the determination is Yes, coordinates are output in the region F22, and the process goes back to the step S76 in FIG. 14. When the determination is No, a touch-ON-check is carried out in regions F32, F33 and F23 (step S109 in FIG. 22, steps S112 and S95 in FIG. 22). When the determination is No in the step S95, the process is ended. That is to say that the control unit 16 detects coordinates in the region F22 and regions along the direction of between 270° and 360° from the region F22, and does not detect coordinates in other regions.

According to the variant of the second embodiment, when coordinates are output in the region Fmn (step S50 in FIG. 11), in the following steps (from the step S51 in FIG. 12), the control unit 16 detects coordinates in regions along the direction determined based on the operation in FIG. 14. Thus, it becomes possible to speed up the operating speed of the touch panel. Especially, when the touch panel is pressed with a finger sliding, the smooth drawing to the input becomes possible in a drawing input mode for example.

In the example illustrated in FIG. 10B, the direction of the vector includes four directions along the direction of sides of the touch panel 210, but is not limited to this example. That is to say that the direction may include more than or less than four directions, and it is not necessary that the direction is along sides of the touch panel. In the second embodiment and the variant of the second embodiment, coordinates are detected in regions neighboring the region Fmn, but regions where coordinates are detected are not limited to those. For example, the coordinates may be detected in regions within two rows or/and two columns from the region Fmn, or regions within three rows or/and three columns from the region Fmn. That is to say that it becomes possible to speed up the operating speed of the touch panel by detecting coordinates in regions neighboring the region Fmn.

Third Embodiment

Figure 23A:
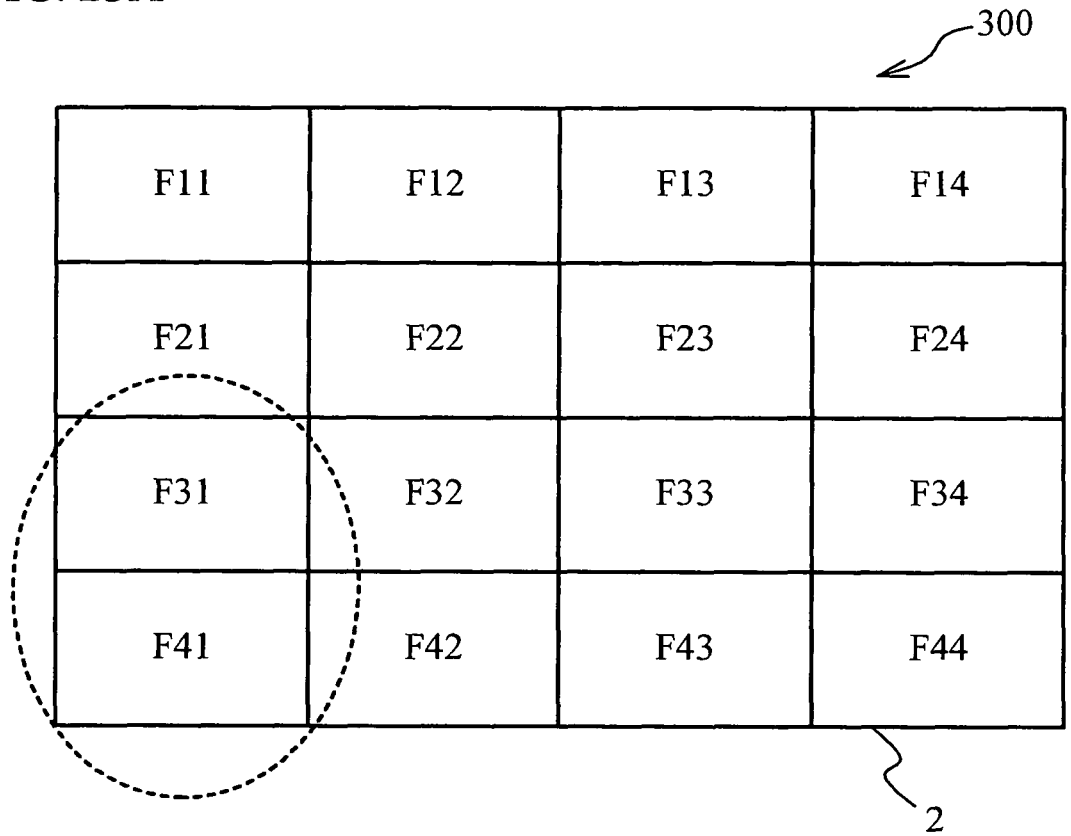
FIG. 23A is a plane view illustrating a touch panel 300 provided with extraction wirings.

Now a description will be given of a third embodiment. A description will be given of a touch panel provided with an extraction wiring. FIG. 23A is a plane view illustrating a touch panel 300 provided with an extraction wiring, and FIG. 23B is an enlarged view illustrating the area including the extraction wiring (see the dotted line region in FIG. 23A).

Figure 23B:
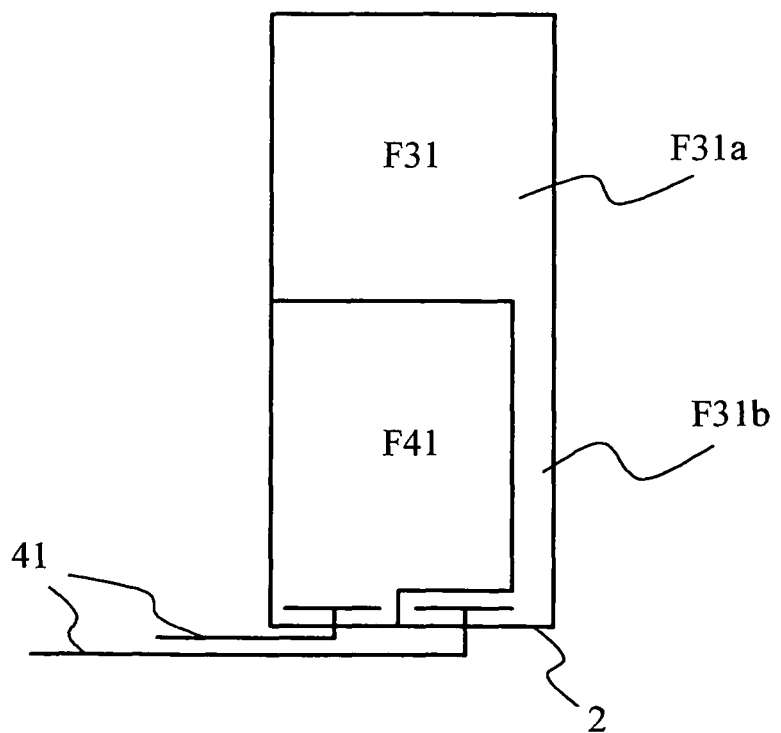
FIG. 23B is an enlarged view illustrating an area including an extraction wiring.

As illustrated in FIG. 23A and FIG. 23B, the first conductive film 2 is divided into multiple regions, and each region is provided with a wiring 41 for connecting to a pull-down resistor. Wirings 41 are located along the upper side and lower side of the touch panel. Consequently, each of regions F21 through F24 and regions F31 through F34 has an extraction wiring which is extracted to the column-wise direction. That is to say that the region F31 (a first region) includes a main region F31a and an extraction wiring F31b for example as illustrated in FIG. 23B. The extraction wiring F31b is formed neighboring the region F41. In other words, the extraction wiring F31b is formed between regions F41 and F42. On the contrary, the region F41 (a second region) is not provided with an extraction wiring because it contacts with the lower side of the touch panel. Respective extraction wirings of regions F21 through F24 are extracted to the upper side, and regions F11 through F14 are not provided with an extraction wiring.

As the width of the extraction wiring F31b is smaller than the width of the main region F31a, the resistance of the extraction wiring F31b becomes higher than the resistance of the main region F31a. Therefore, the resistance of the region F31 becomes higher than the resistance of the region F41. As a result, a difference occurs between potentials supplied to pull-down resistors in the region F31 and the region F41. There is a case that the potential of the signal transmitted from the region F31 is made to be same as the potential of the signal transmitted from the region F41 by changing the value of the pull-down resistor to correct the difference of potentials, for example. As a correction method, there is a case that an offset voltage is applied to the signal transmitted from the region F31. Moreover, to filter out the noise which is generated in the signal transmitted from the region F31, the shielding frequency of the filter is made different between a case where the filter is coupled to the region F31 and a case where the filter is coupled to region F41. More specifically, pass band of the filter is set to a low-frequency side in a case where the filter is coupled to the region F31 compared to a case where the filter is coupled to the region F41.

However, if the number of times of changing the resistance of the pull-down resistor or the shielding frequency of the filter increases, there is a possibility that the operating speed of the touch panel becomes slow. Especially, it takes a certain amount of time till the filter behaves stably after changing the shielding frequency. Therefore, if coordinates are detected in multiple regions sequentially, there is possibility that the operating speed of the touch panel becomes slow.

A description will now be given of a touch panel in accordance with a third embodiment the touch panel. In the touch panel in accordance with the third embodiment, multiple regions are grouped by row, and coordinates are detected group by group. That is to say that main regions of regions F21 through F24 form a group (first group) and main regions of regions F31 through F34 form a group (first group). Regions F11 through F14 and extraction wirings of regions F21 through F24 form a group (second group), and regions F41 through F44 and extraction wirings of regions F31 through F34 form a group (second group).

Figure 24:
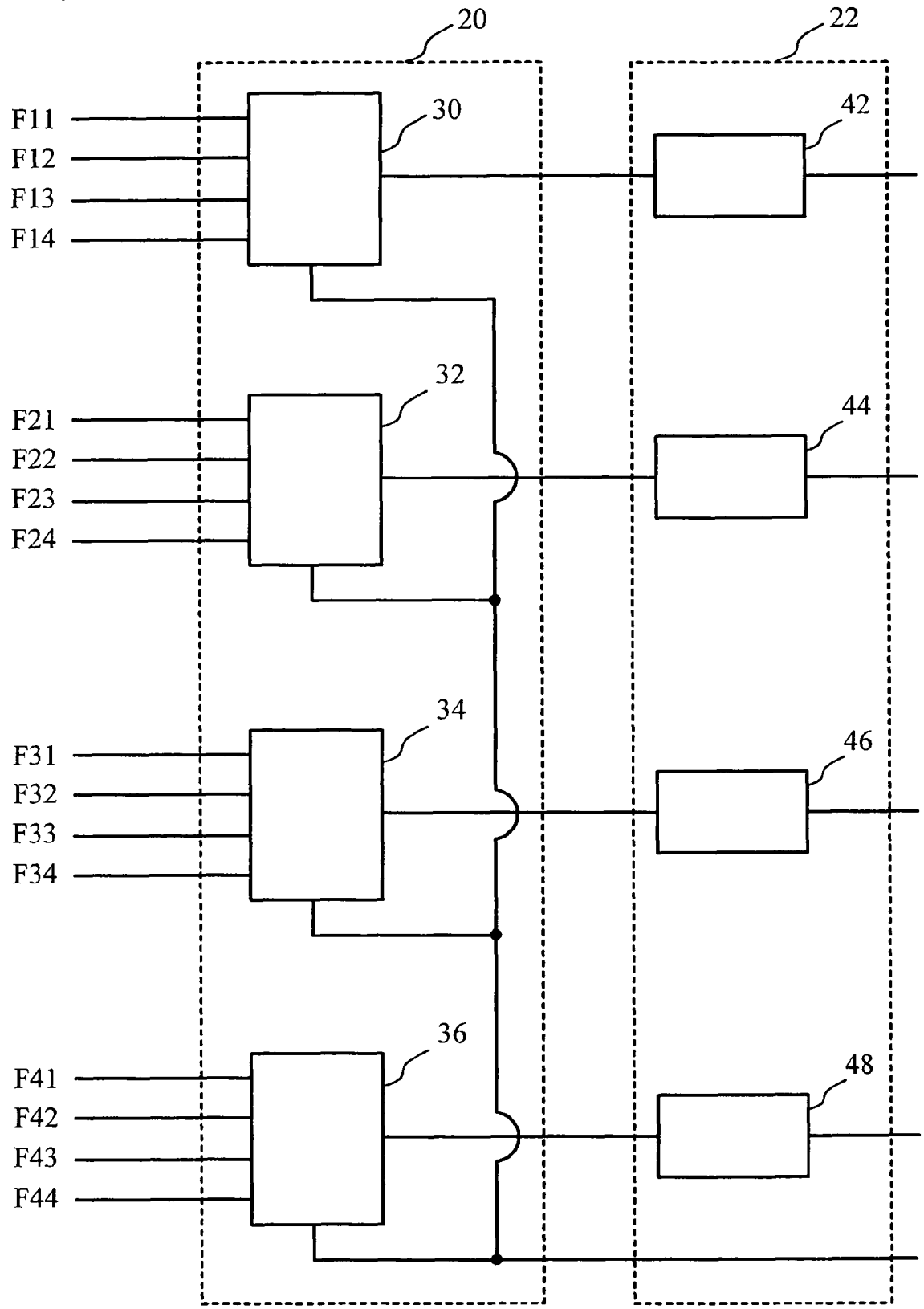
FIG. 24 is a block diagram illustrating a region selection unit and a filtering unit of a touch panel in accordance with a third embodiment.

A description will now be given of a region selection unit and a filtering unit of the touch panel in accordance with the third embodiment. FIG. 24 is a block diagram illustrating a region selection unit and a filtering unit of the touch panel in accordance with the third embodiment (see FIG. 2).

As illustrated in FIG. 24, the region selection unit 20 is provided with multiplexers 30, 32, 34 and 36. The filtering unit 22 is provided with filters 42, 44, 46 and 48. Filters 42 through 48 are low-pass filters.

Regions F11 through F44 are grouped by row. Groups are coupled to respective multiplexers 30 through 36. Multiplexers 30, 32, 34, and 36 are coupled to filters 42, 44, 46 and 48 respectively. The multiplexer receives signals transmitted from regions, and a select signal transmitted from the control unit 16 (see FIG. 2). The multiplexer 30 can select a signal, which is transmitted from the region where coordinates are detected, from signals transmitted from regions F11 through F14 by using a select signal. The same goes for multiplexers 32 through 36. That is to say that the region selection unit 20 can select a region from the group in a same row.

The pass band of filters 44 and 46 coupled to first groups is on the low-frequency side compared to that of filters 42 and 48 coupled to second groups. This means that first groups and second groups are coupled to filters of which shielding frequencies are different from each other.

Figure 25:
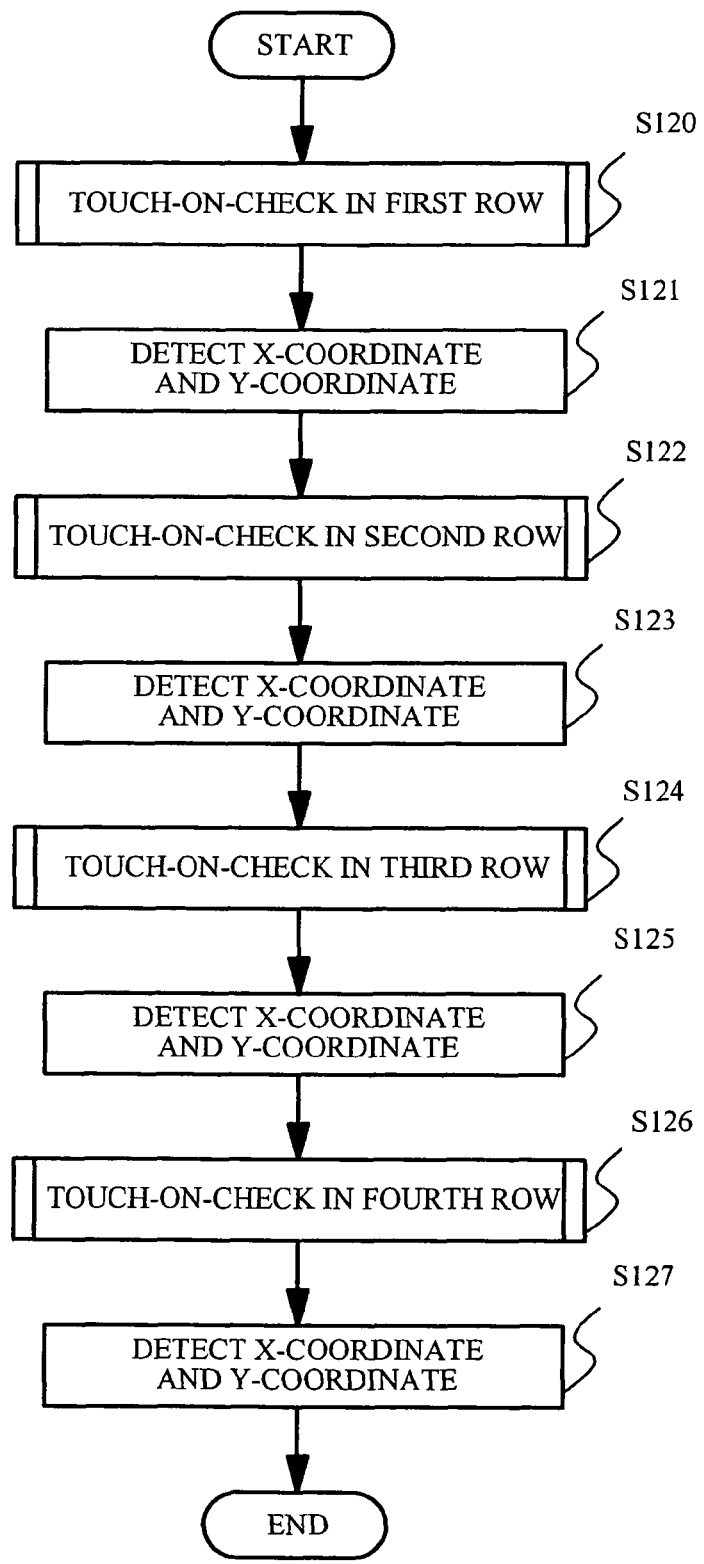
FIG. 25 is a flowchart illustrating a control of the touch panel in accordance with the third embodiment.

A description will now be given of a control of the touch panel in accordance with the third embodiment. FIG. 25 is a flowchart illustrating a control of the touch panel in accordance with the third embodiment.

As illustrated in FIG. 25, the control unit 16 carries out a touch-ON-check in the first row (step S120). After the step S120, the control unit 16 detects the X-coordinate and the Y-coordinate in each region which is located in the first row (step S121). This means that the control unit 16 carries out the process from the step S4 to the step S9 illustrated in FIG. 4.

After the step S121, the control unit 16 carries out a touch-ON-check in the second row (step S122). After the step S122, the control unit 16 detects the X-coordinate and the Y-coordinate in each region which is located in the second row (step S123). After the step S123, the control unit 16 performs same process in third and fourth rows (steps S124 through S127), and the process is ended.

According to the third embodiment, multiple regions are grouped into a group that includes extraction wirings and a group that does not include extraction wirings, and groups are coupled to filters of which shielding frequencies are different from each other. The control unit 16 detects coordinates in each group. Therefore, as it is not necessary to correct the potential difference in each region, and change the shielding frequency of the filter, it becomes possible to speed up the operating speed of the touch panel.

As illustrated in FIG. 24, in the third embodiment, groups are coupled to different filters, but the composition is not limited to this embodiment. For example, as illustrated in FIG. 23A, resistances of regions F21 through F24 and regions F31 through F34 become high because they are provided with extraction wirings. Thus, regions F21 through F34 may be couple to a same filter. In addition, regions F11 through F14 and regions F41 through F44 to which an extraction wiring is not provided may be coupled to the same filter. Consequently, as the number of filters can be reduced, the downsizing and cost reduction of the touch panel becomes possible. As illustrated in FIG. 23A, in the third embodiment, the extraction wiring is extracted to the column-wise direction, but may be extracted to the row-wise direction. In this case, regions are grouped by column. Moreover, the extraction wiring may be extracted to the direction other than row-wise and column-wise directions.

Fourth Embodiment

A description will now be given of a fourth embodiment. In the fourth embodiment, the first conductive film 2 is divided into multiple regions, and regions F21 through F24 and regions F31 through F34 include respective extraction wirings which are extracted to the column-wise direction for example as illustrated in FIG. 23A. Regions F11 through F44 are grouped by row. That is to say that main regions of regions F21 through F24 form a group (first group) and main regions of regions F31 through F34 form a group (first group). Regions F11 through F14 and extraction wirings of regions F21 through F24 form a group (second group) and regions F41 through F44 and extraction wirings of regions F31 through F34 form a group (second group).

Figure 26A:
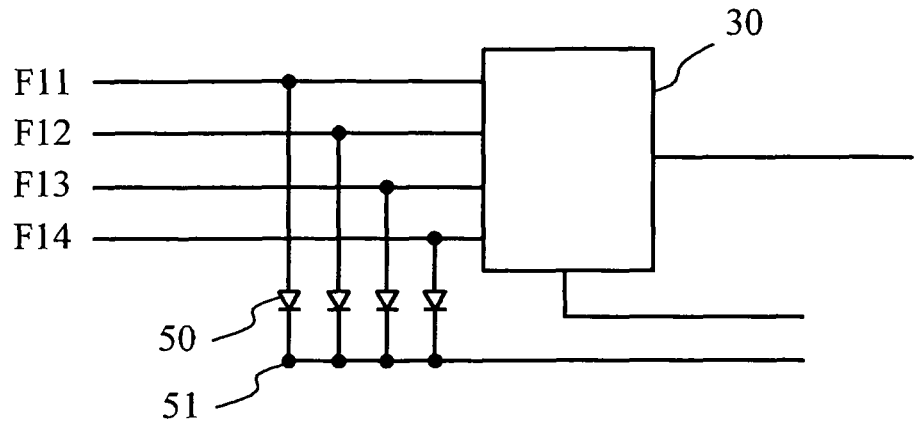
FIGS. 26A through 26C are diagrams illustrating a region selection unit in accordance with a fourth embodiment.
Figure 26B:
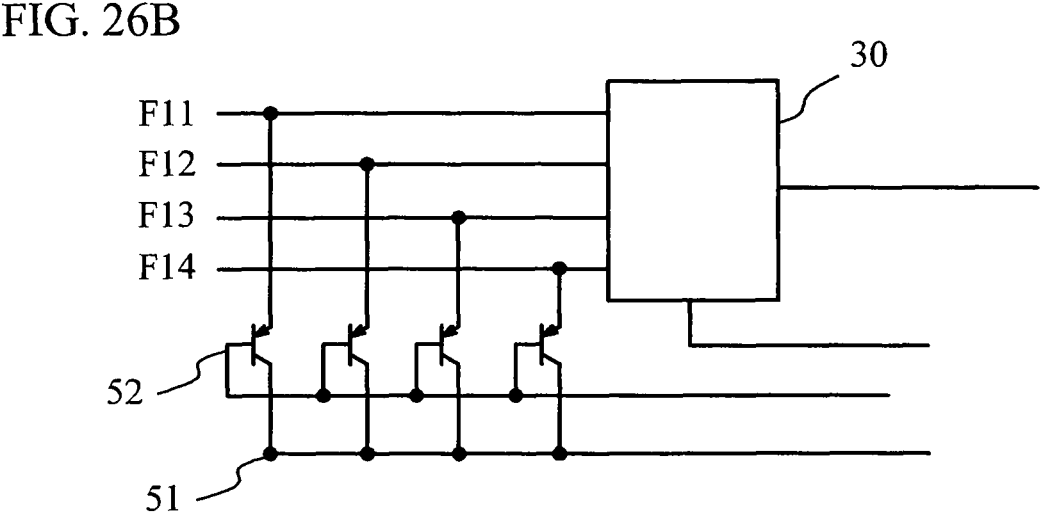
Figure 26C:
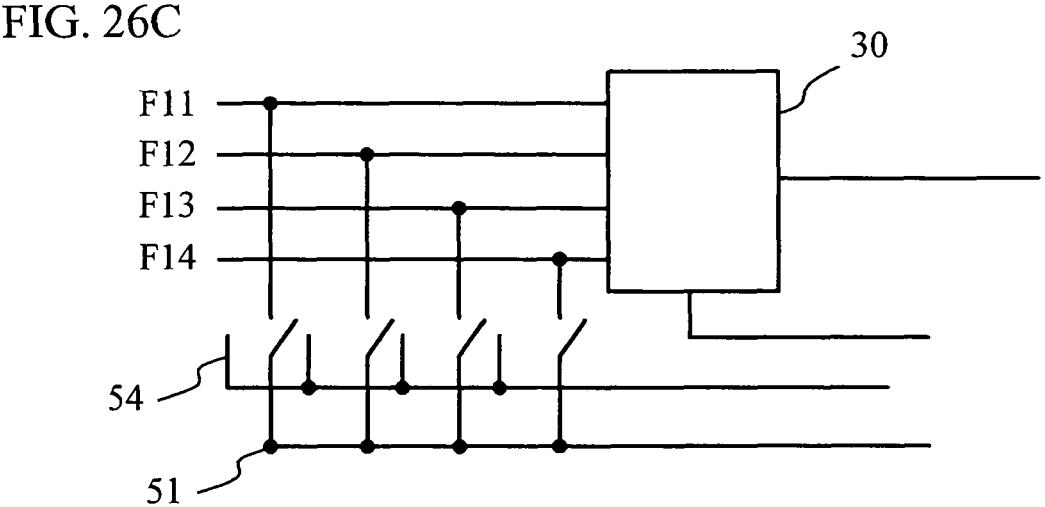

A description will be given of a region selection unit in accordance with the fourth embodiment. FIGS. 26A through 26C are diagrams illustrating the region selection unit in accordance with the fourth embodiment. In each drawing, a part of the region selection unit 20 relating to regions F11 through F14 is illustrated.

As illustrated in FIG. 26A, the multiplexer 30 of the region selection unit 20 is coupled to regions F11 through F14. This means that regions are grouped by row, and coupled to one multiplexer. Moreover, the multiplexer 30 receives signals transmitted from region F11 through F14 in response to the contact of the first conductive film 2 with the second conductive film 4 and a select signal transmitted from the control unit 16. In addition, signals transmitted from region F11 through F14 are input to diodes 50. Output sides of diodes 50 are connected to one wiring by nodes 51. In other words, nodes 51 function as a combining unit that combines signals transmitted from regions F11 through F14 in response to the contact of the first conductive film 2 with the second conductive film 4 into a single signal (hereinafter, referred to as a "combined signal"). Diodes 50 prevent signals of output sides from counterflowing to input sides. For example, diodes 50 prevent a signal transmitted from the region F11 from counterflowing and passing into wirings coupled to regions F12 through F14. Signals transmitted from regions F11 through F14 are input to the filtering unit 22 via diodes 50 and to the control unit 16 (see FIG. 2).

The control unit 16 can detect the contact of the first conductive film 2 with the second conductive film 4 in at least one of regions F11 through F14 by receiving a combined signal. In other words, the control unit 16 determines that the first conductive film 2 contacts with the second conductive film 4 in the group composed of regions F11 through F14 in response to the reception of the combined signal.

Regions F21 through F24, regions F31 through F34, and regions F41 through F44 form respective groups, and are coupled to multiplexers and filters corresponding to groups.

Figure 27:
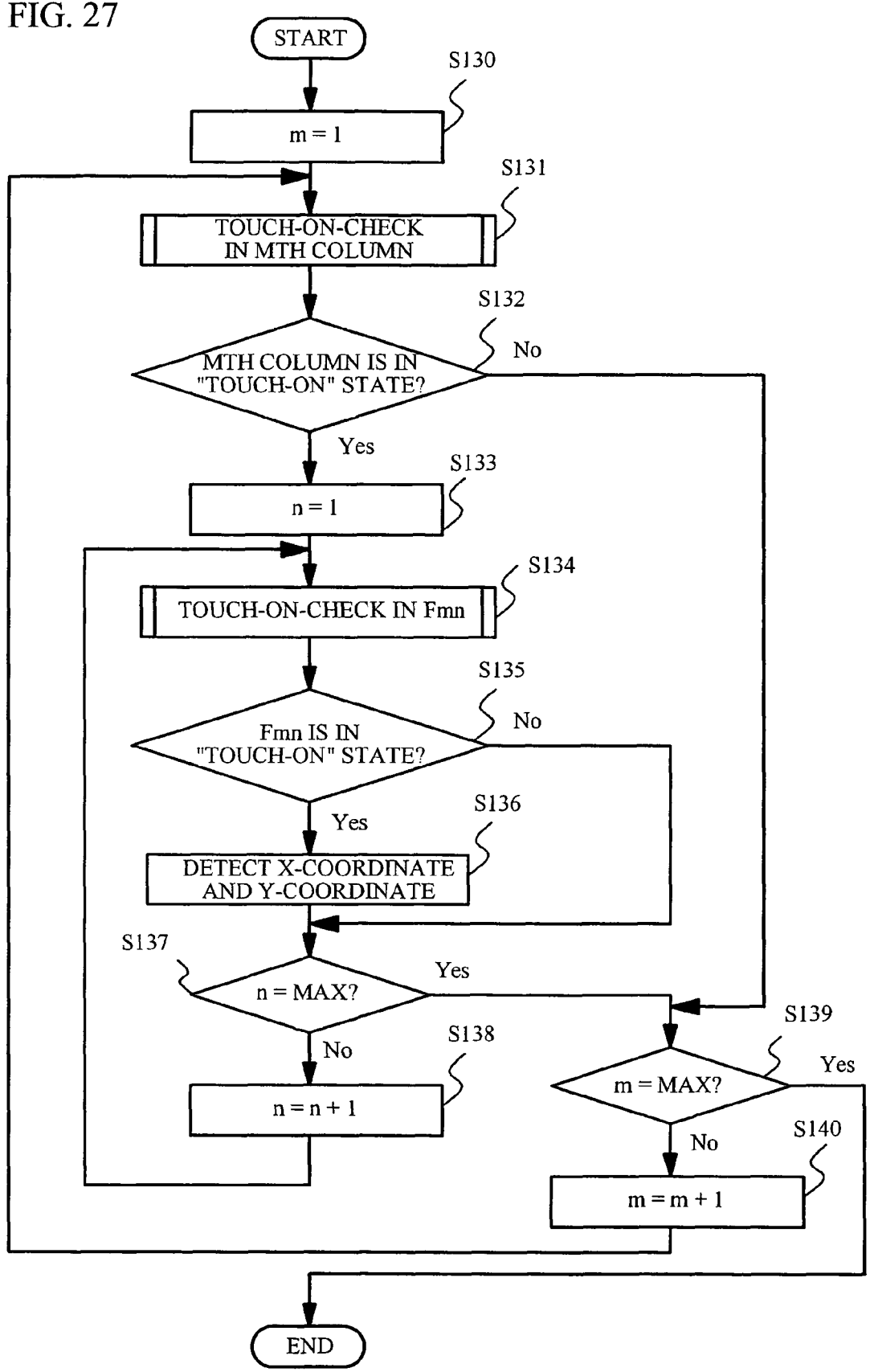
FIG. 27 is a flowchart illustrating the control of the touch panel in accordance with the fourth embodiment.

A description will be given of a control of the touch panel in accordance with the fourth embodiment. FIG. 27 is a flowchart illustrating the control of the touch panel in accordance with the fourth embodiment.

As illustrated in FIG. 27, the control unit 16 sets m to 1 (m=1) (step S130). After the step S130, the control unit 16 carries out a touch-ON-check in the mth column (step S131). After the step S131, the control unit 16 determines whether the mth column is in a "touch-ON" state (step S132). That is to say that the control unit 16 determines whether the first conductive film 2 contacts with the second conductive film 4 in each group. When the determination is No, the process goes to the step S139 described later.

When the determination is Yes, the control unit 16 sets n to 1 (n=1) (step S133). After the step S133, the control unit 16 carries out a touch-ON-check in the region Fmn (step S134), and determines whether the region Fmn is in a "touch-ON" state (step S135).

When the determination is Yes, the control unit 16 detects coordinates in the region Finn (step S136). After the step S136, or when the determination is No in the step S135, the control unit 16 determines whether n is equal to MAX (n=MAX) (step S137). When the determination is Yes, the control unit 16 sets n to n+1 (n=n+1) (step S138), and the process goes back to the step S134. This means that the process from the step S134 to the step S136 is carried out in the region, of which the row is one-subsequent to that of the region in which the process from the step S134 to the step S136 is executed previously, of regions locating in the mth column which is determined whether being in a "touch-ON" state in the step S132.

When the determination is No in the step S137, the control unit 16 determines whether m is equal to MAX (m=MAX) (step S139). When the determination is Yes, the control unit 16 sets m to m+1 (m=m+1) (step S140), and the process goes back to the step S131. This means that the process from the step S131 to the step S139 is carried out in a column which is one-subsequent to the column which is determined whether being in a "touch-ON" state in the step S132. When the determination is Yes in the step S139, the process is ended.

According to the fourth embodiment, the control unit 16 determines whether the first conductive film 2 contacts with the second conductive film 4 in each group (a case where the determination is Yes in the steps S131 and S132 in FIG. 27), and detects coordinates in the group where the first conductive film 2 contacts with the second conductive film 4 (step S134). Moreover, the control unit 16 does not detect coordinates in the group where the first conductive film 2 does not contact with the second conductive film 4 (a case where the determination is No in the step S132). Thus, the number of times of carrying out a touch-ON-check and the coordinate detection is small compared to a case that a touch-ON-check and a coordinate detection are carried out in each region sequentially. Therefore, it becomes possible to speed up the operating speed of the touch panel.

Especially, when extraction wirings are formed as illustrated in FIGS. 23A and 23B, regions can be divided into a group that includes extraction wirings and a group that does not include extraction wirings, and groups can be coupled to filters of which shielding frequencies are different from each other. Accordingly, as it is unnecessary to correct the potential difference with respect to each region, and change the shielding frequency of the filter, it becomes possible to further speed up the operating speed of the touch panel.

Nodes 51 combine signals transmitted from regions forming a group into one signal, and the control unit 16 determines that the first conductive film 2 contacts with the second conductive film 4 in the group based on the reception of the combined signal. Therefore, it is possible to determine the group where the first conductive film 2 contacts with the second conductive film 4 automatically, and detect coordinates with a simple configuration.

In the fourth embodiment, a description was given of a case where multiple regions are grouped by row, but a grouping rule is not limited to this embodiment. For example, regions may be grouped by column. That is to say that each group may be formed by some regions of multiple regions. Moreover, in the fourth embodiment, multiple regions are divided into a group that includes extraction wirings and a group that does not include extraction wirings, but the grouping rule is not limited to this embodiment.

A description will now be given of a variant of the fourth embodiment. FIGS. 26B and 26C are diagrams illustrating a region selection unit in accordance with the variant of the fourth embodiment.

As illustrated in FIG. 26B, semiconductor switches 52 may be used instead of diodes 50. In this case, a control signal is input to the semiconductor switch 52 from the control unit 16.

As illustrated in FIG. 26C, magnetic switches 54 may be used instead of diodes 50. In this case, a control signal is input to the magnetic switch 54 from the control unit 16.

Fifth Embodiment

Figure 28A:
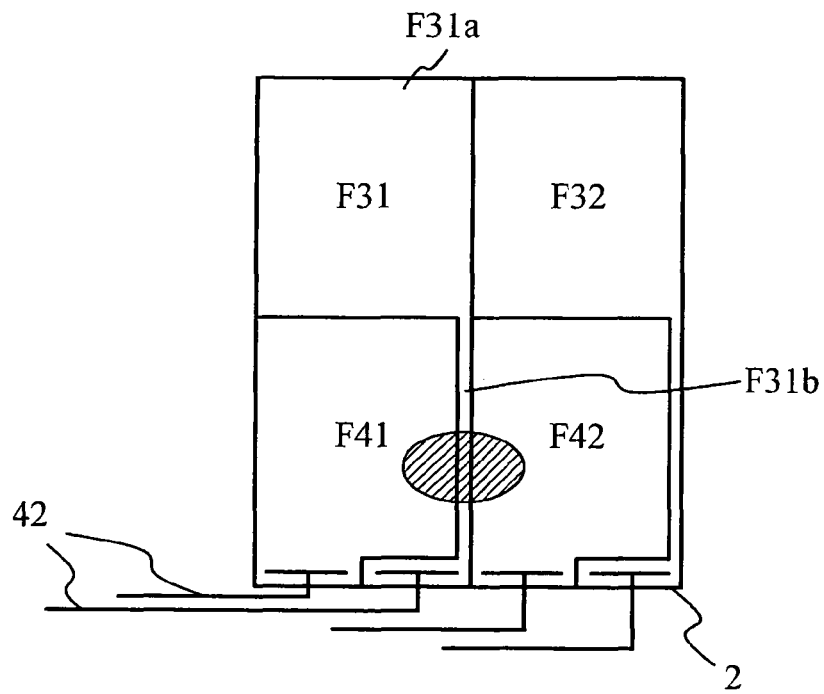
FIG. 28A is an enlarged view illustrating an extraction wiring of the touch panel in accordance with the fifth embodiment.

A description will now be given of a fifth embodiment. FIG. 28A is an enlarged diagram illustrating an area including extraction wirings of a touch panel in accordance with the fifth embodiment (see the doted line region in FIG. 23A).

As illustrated in FIG. 28A, the region F31 includes a main region F31a and an extraction wiring F31b. The extraction wiring F31b is located between the region F41 and the region F42.

Here, think a case where the first conductive film 2 contacts with the second conductive film 4 in regions F41 and F42 and the extraction wiring F31b as illustrated with diagonal lines. This means a case where a point that straddles the region F41, the extraction wiring F31b, and the region F42 is touched by a finger or the like in the first conductive film 2 for example. In this case, even though a user intends to input a single point, there is a case that it is determined that three points are input. Thus, there is a possibility that it is determined that an input is carried out in the region F31, and the incorrect operation of the touch panel occurs.

Figure 29:
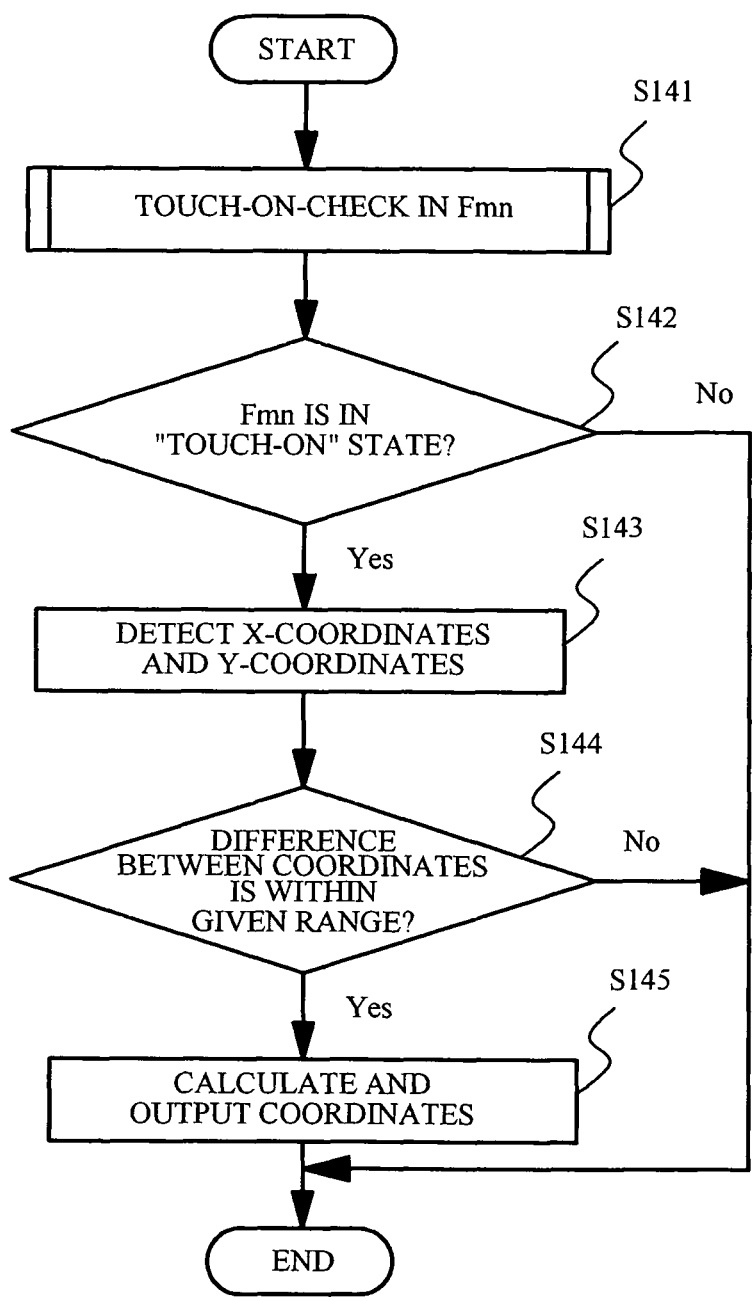
FIG. 29 is a flowchart illustrating a control of the touch panel in accordance with the fifth embodiment.

The touch panel in accordance with the fifth embodiment determines that a single point is input when the difference of coordinates in regions is within a given range, and outputs coordinates. A detail description is given with reference to a flowchart. FIG. 29 is a flowchart illustrating a control of the touch panel in accordance with the fifth embodiment.

As illustrated in FIG. 29, the control unit 16 (see FIG. 2) carries out a touch-ON-check in regions Fmn (step S141), and determines whether regions Fmn are in a "touch-ON" state (step S142). This means that the control unit 16 determines whether the first conductive film 2 contacts with the second conductive film 4 in each region.

When the determination is Yes, the control unit 16 detects X-coordinates and Y-coordinates of points where the first conductive film 2 contacts with the second conductive film 4 in regions Fmn (step S143). After the step S143, the control unit 16 determines whether differences between detected X-coordinates and differences between detected Y-coordinates are within a given range (step S144). When the determination is Yes, the control unit 16 calculates coordinates based on coordinates determined whether being within a given range in the step S144, and outputs calculated coordinates (step S145). After the step S145, when the determination is No in the step S142, or when the determination is No in the step S144, the process is ended.

A description will be given of a process of steps S144 and S145 specifically with reference to the example in FIG. 28A. Here, the X-coordinate and the Y-coordinate (first coordinates) detected in the region F41 (first region) are described as X(F41) and Y(F41) respectively. In the same manner, coordinates (second coordinates) detected in the region F42 (second region) are described as X(F42) and Y(F42). In addition, coordinates (third coordinates) detected in the extraction wiring F31b of the region F31 (third region) is described as X(F31b) and Y(F31b).

When the given range in the step S144 is $\alpha$, the control unit 16 determines whether |X(F41)−X(F42)| is smaller than $\alpha$, |X(F42)−X(F31b)| is smaller than $\alpha$, |Y(F41)−Y(F42)| is smaller than $\alpha$, and |Y(F42)−Y(F31b)| is smaller than $\alpha$ (step S144). When detected coordinates meet above relations, the control unit 16 determines that a single point is input, and outputs the X-coordinate (a fourth coordinate) calculated based on X(F41), X(F31b) and X(F42). In addition, the control unit 16 outputs the Y-coordinate (a fourth coordinate) calculated based on Y(F41), Y(F31b) and Y(F42) (step S145). That is to say that the control unit 16 outputs coordinates based on detected three coordinates.

According to the fifth embodiment, even though coordinates are detected in regions and an extraction wiring, coordinates calculated based on detected coordinates are output. Therefore, the accuracy of the coordinate detection of the touch panel is improved. Especially, as the input in the extraction wiring is ignored and it is determined that the input is carried out at a single point, it becomes possible to prevent the incorrect operation.

In the step S145, the control unit 16 outputs average coordinates of coordinates detected in regions F41 and F42 for example. In addition, the control unit 16 may output coordinates other than average coordinates. A description was given with a case where the given range is a in the X-coordinate and the Y-coordinate. However the given range may be different between the X-coordinate and the Y-coordinate.

Figure 28B:
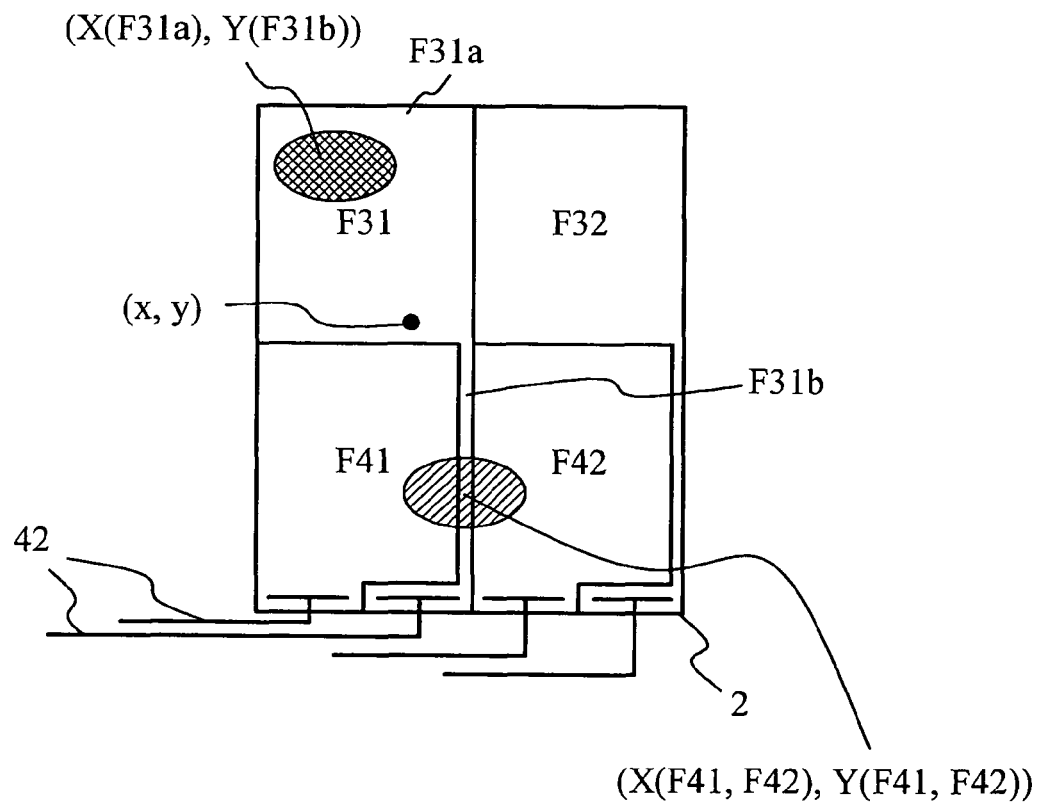
FIG. 28B is an enlarged view illustrating an area including an extraction wiring of a touch panel in accordance with a variant of the fifth embodiment.

A description will now be given of a variant of the fifth embodiment. FIG. 28B is an enlarged view illustrating an extraction wiring of a touch panel in accordance with a variant of the fifth embodiment (see the dotted line region in FIG. 23A).

As illustrated with hatching in FIG. 28B, think a case where the first conductive film 2 contacts with the second conductive film 4 in main region F31a of the region F31 in addition to regions F41 and F42, and the extraction wiring F31b of the region F31 described in FIG. 28A. In this case, as indicated by black circle in the drawing, average coordinates of coordinates detected in the region indicated with diagonal lines and the region indicated with hatching may be output. In this case, coordinates of the point where the actual input is carried out in the hatched region are not output. Therefore, it may be determined that the unintended input is carried out, and the incorrect operation of the touch panel may occur. In the variant of the fifth embodiment, coordinates of the point where the actual input is carried out are output. More detail will be described with reference to a flowchart illustrated in FIG. 29 and the example of FIG. 28B.

As steps S141 and S142 in FIG. 29 are already described, the description will be omitted. After the step S142, the control unit 16 detects X(F41), Y(F41), X(F42), Y(F42), X(F31*b*), Y(F31*b*), X(F31*a*), and Y(F31*a*) (step S143). X(F31*a*) and Y(F31*a*) are coordinates (fifth coordinates) of the point where the first conductive film 2 contacts with the second conductive film 4 in the main region F31*a* of the region F31.

After the step S143, the control unit 16 determines whether difference between detected X-coordinates and difference between detected Y-coordinates are within a given range (step S144). When the determination is Yes, the control unit 16 calculates one coordinates based on coordinates detected in regions F41 and F42, and the extraction wiring F31*b* of the region F31 as described in FIG. 28A and FIG. 29. Detected X-coordinates and Y-coordinates are described as X(F41, F42) and Y(F41, F42). Moreover, the control unit 16 calculates coordinates x and y (sixth coordinates) of the black circle illustrated in FIG. 28B. The coordinate x is an average of X(F31*a*) and X(F41, F42), and the coordinate y is an average of Y(F31*a*) and Y(F41, F42).

The control unit 16 calculates and outputs X(F31*a*) and Y(F31*a*) that are coordinates of the point where the first conductive film 2 actually contacts with the second conductive film 4 in main region F31*a* based on X(F41, F42), x, Y(F41, F42) and y (step S145). More specifically, X(F41*a*) is calculated by the equation X(F41*a*)=2x−X(F41, F42), and Y(F41*a*) is calculated by the equation Y(F41*a*)=2y−Y(F41, F42). After the step S145, the process is ended.

According to the variant of the fifth embodiment, even though coordinates are detected at two points as illustrated in FIG. 28B, it is possible to output the coordinates of the point where the actual input is carried out. Therefore, the accuracy of the coordinate detection of the touch panel is improved, and the incorrect operation is prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch panel comprising:
a first conductive film divided into multiple regions insulated from each other;
a second conductive film facing and located away from the first conductive film;
a pair of electrodes provided to the second conductive film, the electrodes facing each other;
another pair of electrodes that is perpendicular to the pair of electrodes and provided to the second conductive film, the electrodes facing each other; and
a control unit configured to determine whether the first conductive film contacts with the second conductive film in all regions, detect one of an X-coordinate and a Y-coordinate of a point where the first conductive film contacts with the second conductive film by applying a voltage to the pair of electrodes in a case where the first conductive film contacts with the second conductive film without discharging the voltage applied to the pair of electrodes, discharge the voltage applied to the pair of electrodes after detecting one of the X-coordinate and the Y-coordinate in all regions, and detects the other of the X-coordinate and the Y-coordinate in all regions by applying a voltage to the another pair of electrodes after discharging the voltage applied to the pair of electrodes.

2. The touch panel according to claim 1, wherein in a case where the first conductive film contacts with the second conductive film in a region out of the regions, the control unit detects one of the X-coordinate and the Y-coordinate in the region where the first conductive film contacts with the second conductive film, and subsequently determines whether the first conductive film contacts with the second conductive film in a region different from the region where the first conductive film contacts with the second conductive film, of the regions.

3. The touch panel according to claim 1, wherein the control unit detects one of the X-coordinate and the Y-coordinate in each region after determining whether the first conductive film contacts with the second conductive film in each region.

4. The touch panel according to claim 1, wherein the control unit memorizes a region where the first conductive film contacts with the second conductive film when the first conductive film contacts with the second conductive film, and detects the X-coordinate and the Y-coordinate in the region which is memorized.

5. A touch panel comprising:
a first conductive film divided into regions insulated from each other and connected to a wiring, respectively, wherein the regions include a first region, a second region positioned adjacent to the first region, and a third region, the third region including a main region and an extraction wiring, the main region being located on an inner side of the first conductive film relative to the first region and the second region, the extraction wiring extending from the main region to an outer side of the first conductive film and being located between the first region and the second region and connecting the main region and the wiring corresponding to the third region;
a second conductive film facing and located away from the first conductive film; and
a control unit configured to output fourth coordinates based on first coordinates and second coordinates, in a case where the first conductive film contacts with the second conductive film in the first region, the second region and the extraction wiring of the third region, and each of differences between first coordinates and second coordinates, and a each of differences between the first coordinates and third coordinates are within given ranges,
the first coordinates being coordinates of a point where the first conductive film contacts with the second conductive film in the first region, the second coordinates being coordinates of a point where the first conductive film contacts with the second conductive film in the second region, and the third coordinates being coordinates of a point where the first conductive film contacts with the second conductive film in the extraction wiring.

6. The touch panel according to claim 5, wherein the control unit outputs average coordinates of the first coordinates and the second coordinates as the fourth coordinates.

7. The touch panel according to claim 5, wherein the control unit calculates sixth coordinates based on fifth coordinates and the fourth coordinates, and outputs the fifth coordinates based on the fourth coordinates and the sixth coordinates, the fifth coordinates being coordinates of a point where the first conductive film contacts with the second conductive film in the main region of the third region.

8. The touch panel according to claim 7, wherein the control unit sets average coordinates of the fourth coordinates and the fifth coordinates to the sixth coordinates.

9. A coordinate detection method in a touch panel comprising:

determining whether a first conductive film, which is divided into multiple regions insulated from each other, contacts with a second conductive film, which faces and is located away from the first conductive film, in all regions;

detecting one of an X-coordinate and a Y-coordinate of a point where the first conductive film contacts with the second conductive film by applying a voltage to a pair of electrodes provided to the second conductive film, without discharging the voltage applied to the pair of electrodes, when the first conductive film contacts with the second conductive film, the electrodes facing each other;

discharging the voltage applied to the pair of electrodes after detecting one of the X-coordinate and the Y-coordinate in all regions; and detecting the other of the X-coordinate and the Y-coordinate by applying a voltage to another pair of electrodes facing each other in all regions after discharging the voltage applied to the pair of electrodes, wherein the another pair of electrodes is perpendicular to the pair of electrodes and provided to the second conductive film.

* * * * *

UNITED STATES PATENT AND TRADEMARK OFFICE
CERTIFICATE OF CORRECTION

PATENT NO.        : 8,803,840 B2
APPLICATION NO.   : 12/926846
DATED             : August 12, 2014
INVENTOR(S)       : Satoshi Sakurai et al.

It is certified that error appears in the above-identified patent and that said Letters Patent is hereby corrected as shown below:

In the Claims

Column 22, Line 60, In Claim 5, before "each" delete "a".

Signed and Sealed this
Fourth Day of November, 2014

Michelle K. Lee
*Deputy Director of the United States Patent and Trademark Office*